US012508508B2

(12) United States Patent
Ng et al.

(10) Patent No.: US 12,508,508 B2
(45) Date of Patent: Dec. 30, 2025

(54) MOTION-INFERRED PLAYER CHARACTERISTICS

(71) Applicant: Electronic Arts Inc., Redwood City, CA (US)

(72) Inventors: Victor York Win Ng, Vancouver (CA); Thomas Caleffi Scaletscky, Burnaby (CA)

(73) Assignee: Electronic Arts Inc., Redwood City, CA (US)

( * ) Notice: Subject to any disclaimer, the term of this patent is extended or adjusted under 35 U.S.C. 154(b) by 169 days.

(21) Appl. No.: 18/483,164

(22) Filed: Oct. 9, 2023

(65) Prior Publication Data

US 2025/0099855 A1 Mar. 27, 2025

Related U.S. Application Data

(60) Provisional application No. 63/584,311, filed on Sep. 21, 2023.

(51) Int. Cl.
*A63F 13/56* (2014.01)
*A63F 13/52* (2014.01)

(52) U.S. Cl.
CPC .............. *A63F 13/56* (2014.09); *A63F 13/52* (2014.09)

(58) Field of Classification Search
CPC .. A63F 13/56; A63F 13/52; A63F 2300/6607; A63F 13/65; G06T 13/20; G06T 13/40
See application file for complete search history.

(56) References Cited

U.S. PATENT DOCUMENTS 5,274,801 A 12/1993 Gordon
5,548,798 A 8/1996 King
5,982,389 A 11/1999 Guenter et al.
(Continued)

FOREIGN PATENT DOCUMENTS

CN 102509272 A 6/2012
CN 103546736 A 1/2014
(Continued)

OTHER PUBLICATIONS

Kinematic Motion Analysis with Volumetric Motion Capture by Zhu et al. published to 2022 26th International Conference Information Visualisation (IV) (Year: 2022).*
(Continued)

*Primary Examiner* — Peter J Iannuzzi
(74) *Attorney, Agent, or Firm* — Knobbe, Martens, Olson & Bear, LLP

(57) ABSTRACT

A system is disclosed that is able to combine motion capture data with volumetric capture data to capture player style information for a player. This player style information or player style data may be used to modify animation models used by a video game to create a more realistic look and feel for a player being emulated by the video game. This more realistic look and feel can enable the game to replicate play style of a player. For example, one soccer player may run with his elbows closer to his body and his forearm may swing across his torso. While another soccer player who is perhaps more muscular may run with his elbows and arms further from his body and his forearms may not cross in front of his torso when running.

20 Claims, 8 Drawing Sheets

(56) References Cited

U.S. PATENT DOCUMENTS

| | | | |
|---|---|---|---|
| 5,999,195 | A | 12/1999 | Santangeli |
| 6,064,808 | A | 5/2000 | Kapur et al. |
| 6,088,040 | A | 7/2000 | Oda et al. |
| 6,253,193 | B1 | 6/2001 | Ginter et al. |
| 6,556,196 | B1 | 4/2003 | Blanz et al. |
| 6,961,060 | B1 | 11/2005 | Mochizuki et al. |
| 7,006,090 | B2 | 2/2006 | Mittring |
| 7,403,202 | B1 | 7/2008 | Nash |
| 7,415,152 | B2 | 8/2008 | Jiang et al. |
| 7,944,449 | B2 | 5/2011 | Petrovic et al. |
| 8,100,770 | B2 | 1/2012 | Yamazaki et al. |
| 8,142,282 | B2 | 3/2012 | Canessa et al. |
| 8,154,544 | B1 | 4/2012 | Cameron et al. |
| 8,207,971 | B1 | 6/2012 | Koperwas et al. |
| 8,267,764 | B1 | 9/2012 | Aoki et al. |
| 8,281,281 | B1 | 10/2012 | Smyrl et al. |
| 8,395,626 | B2 | 3/2013 | Millman |
| 8,398,476 | B1 | 3/2013 | Sidhu et al. |
| 8,406,528 | B1 | 3/2013 | Hatwich |
| 8,540,560 | B2 | 9/2013 | Crowley et al. |
| 8,599,206 | B2 | 12/2013 | Hodgins et al. |
| 8,624,904 | B1 | 1/2014 | Koperwas et al. |
| 8,648,863 | B1 | 2/2014 | Anderson et al. |
| 8,860,732 | B2 | 10/2014 | Popovic et al. |
| 8,914,251 | B2 | 12/2014 | Ohta |
| 9,117,134 | B1 | 8/2015 | Geiss et al. |
| 9,256,973 | B2 | 2/2016 | Koperwas et al. |
| 9,317,954 | B2 | 4/2016 | Li et al. |
| 9,483,860 | B2 | 11/2016 | Hwang et al. |
| 9,616,329 | B2 | 4/2017 | Szufnara et al. |
| 9,652,879 | B2 | 5/2017 | Aguado |
| 9,741,146 | B1 | 8/2017 | Nishimura |
| 9,811,716 | B2 | 11/2017 | Kim et al. |
| 9,826,898 | B1 | 11/2017 | Jin et al. |
| 9,858,700 | B2 | 1/2018 | Rose et al. |
| 9,861,898 | B2 | 1/2018 | Miura et al. |
| 9,947,123 | B1 | 4/2018 | Green |
| 9,984,658 | B2 | 5/2018 | Bonnier et al. |
| 9,990,754 | B1 | 6/2018 | Waterson et al. |
| 10,022,628 | B1 | 7/2018 | Matsumiya et al. |
| 10,096,133 | B1 | 10/2018 | Andreev |
| 10,118,097 | B2 | 11/2018 | Stevens |
| 10,198,845 | B1 | 2/2019 | Bhat et al. |
| 10,314,477 | B1 | 6/2019 | Goodsitt et al. |
| 10,388,053 | B1 | 8/2019 | Carter, Jr. et al. |
| 10,403,018 | B1 | 9/2019 | Worsham |
| 10,440,443 | B2 | 10/2019 | Casey et al. |
| 10,535,174 | B1 | 1/2020 | Rigiroli et al. |
| 10,726,611 | B1 | 7/2020 | Court |
| 10,733,765 | B2 | 8/2020 | Andreev |
| 10,755,466 | B2 | 8/2020 | Chamdani et al. |
| 10,792,566 | B1 | 10/2020 | Schmid |
| 10,825,220 | B1 | 11/2020 | Chang et al. |
| 10,856,733 | B2 | 12/2020 | Anderson et al. |
| 10,860,838 | B1 | 12/2020 | Elahie et al. |
| 10,878,540 | B1 | 12/2020 | Stevens |
| 10,902,618 | B2 | 1/2021 | Payne et al. |
| 10,986,400 | B2 | 4/2021 | Hua et al. |
| 11,017,560 | B1 | 5/2021 | Gafni et al. |
| 11,403,513 | B2 | 8/2022 | Hasenclever et al. |
| 11,562,523 | B1 | 1/2023 | Starke et al. |
| 11,670,030 | B2 | 6/2023 | Shi et al. |
| 2002/0054054 | A1 | 5/2002 | Sanbe |
| 2002/0089504 | A1 | 7/2002 | Merrick et al. |
| 2002/0180739 | A1 | 12/2002 | Reynolds et al. |
| 2003/0038818 | A1 | 2/2003 | Tidwell |
| 2004/0027352 | A1 | 2/2004 | Minakuchi |
| 2004/0227760 | A1 | 11/2004 | Anderson et al. |
| 2004/0227761 | A1 | 11/2004 | Anderson et al. |
| 2005/0237550 | A1 | 10/2005 | Hu |
| 2006/0036514 | A1 | 2/2006 | Steelberg et al. |
| 2006/0149516 | A1 | 7/2006 | Bond et al. |
| 2006/0217945 | A1 | 9/2006 | Leprevost |
| 2006/0262114 | A1 | 11/2006 | Leprevost |
| 2007/0085851 | A1 | 4/2007 | Muller et al. |
| 2007/0097125 | A1 | 5/2007 | Xie et al. |
| 2008/0049015 | A1 | 2/2008 | Elmieh et al. |
| 2008/0111831 | A1 | 5/2008 | Son et al. |
| 2008/0152218 | A1 | 6/2008 | Okada |
| 2008/0268961 | A1 | 10/2008 | Brook |
| 2008/0273039 | A1 | 11/2008 | Girard |
| 2008/0316202 | A1 | 12/2008 | Zhou et al. |
| 2009/0066700 | A1 | 3/2009 | Harding et al. |
| 2009/0195544 | A1 | 8/2009 | Wrinch et al. |
| 2009/0315839 | A1 | 12/2009 | Wilson et al. |
| 2010/0134501 | A1 | 6/2010 | Lowe et al. |
| 2010/0251185 | A1 | 9/2010 | Pattenden |
| 2010/0277497 | A1 | 11/2010 | Dong et al. |
| 2011/0012903 | A1 | 1/2011 | Girard |
| 2011/0074807 | A1 | 3/2011 | Inada et al. |
| 2011/0086702 | A1 | 4/2011 | Borst et al. |
| 2011/0119332 | A1 | 5/2011 | Marshall et al. |
| 2011/0128292 | A1 | 6/2011 | Ghyme et al. |
| 2011/0164831 | A1 | 7/2011 | Van Reeth et al. |
| 2011/0187731 | A1 | 8/2011 | Tsuchida |
| 2011/0269540 | A1 | 11/2011 | Gillo et al. |
| 2011/0292055 | A1 | 12/2011 | Hodgins et al. |
| 2012/0083330 | A1 | 4/2012 | Ocko |
| 2012/0115580 | A1 | 5/2012 | Hornik et al. |
| 2012/0220376 | A1 | 8/2012 | Takayama et al. |
| 2012/0244941 | A1 | 9/2012 | Ostergren et al. |
| 2012/0275521 | A1 | 11/2012 | Cui et al. |
| 2012/0303343 | A1 | 11/2012 | Sugiyama et al. |
| 2012/0313931 | A1 | 12/2012 | Matsuike et al. |
| 2013/0050464 | A1 | 2/2013 | Kang |
| 2013/0063555 | A1 | 3/2013 | Matsumoto et al. |
| 2013/0120439 | A1 | 5/2013 | Harris et al. |
| 2013/0121618 | A1 | 5/2013 | Yadav |
| 2013/0222433 | A1 | 8/2013 | Chapman et al. |
| 2013/0235045 | A1 | 9/2013 | Corazza et al. |
| 2013/0263027 | A1 | 10/2013 | Petschnigg et al. |
| 2013/0311885 | A1 | 11/2013 | Wang et al. |
| 2014/0002463 | A1 | 1/2014 | Kautzman et al. |
| 2014/0198106 | A1 | 7/2014 | Sumner et al. |
| 2014/0198107 | A1 | 7/2014 | Thomaszewski et al. |
| 2014/0285513 | A1 | 9/2014 | Aguado |
| 2014/0327694 | A1 | 11/2014 | Cao et al. |
| 2015/0113370 | A1 | 4/2015 | Flider |
| 2015/0126277 | A1 | 5/2015 | Aoyagi |
| 2015/0187113 | A1 | 7/2015 | Rubin et al. |
| 2015/0235351 | A1 | 8/2015 | Mirbach et al. |
| 2015/0243326 | A1 | 8/2015 | Pacurariu et al. |
| 2015/0381925 | A1 | 12/2015 | Varanasi et al. |
| 2016/0026926 | A1 | 1/2016 | Yeung et al. |
| 2016/0042548 | A1 | 2/2016 | Du et al. |
| 2016/0071470 | A1 | 3/2016 | Kim et al. |
| 2016/0217723 | A1 | 7/2016 | Kim et al. |
| 2016/0307369 | A1 | 10/2016 | Freedman et al. |
| 2016/0314617 | A1 | 10/2016 | Forster et al. |
| 2016/0354693 | A1 | 12/2016 | Yan et al. |
| 2017/0132827 | A1 | 5/2017 | Tena et al. |
| 2017/0301310 | A1 | 10/2017 | Bonnier et al. |
| 2017/0301316 | A1 | 10/2017 | Farell |
| 2018/0122125 | A1 | 5/2018 | Brewster |
| 2018/0165864 | A1 | 6/2018 | Jin et al. |
| 2018/0211102 | A1 | 7/2018 | Alsmadi |
| 2018/0239526 | A1 | 8/2018 | Varanasi et al. |
| 2018/0293736 | A1 | 10/2018 | Rahimi et al. |
| 2019/0073826 | A1 | 3/2019 | Bailey et al. |
| 2019/0147224 | A1 | 5/2019 | Li et al. |
| 2019/0228316 | A1 | 7/2019 | Felsen et al. |
| 2019/0295305 | A1 | 9/2019 | Yang et al. |
| 2019/0392587 | A1 | 12/2019 | Nowozin et al. |
| 2020/0058148 | A1 | 2/2020 | Blaylock et al. |
| 2020/0294299 | A1 | 9/2020 | Rigiroli et al. |
| 2020/0353311 | A1 | 11/2020 | Ganguly et al. |
| 2020/0388065 | A1 | 12/2020 | Miller, IV et al. |
| 2021/0019916 | A1 | 1/2021 | Andreev |
| 2021/0166459 | A1 | 6/2021 | Miller, IV |
| 2021/0217184 | A1 | 7/2021 | Payne et al. |
| 2021/0220739 | A1 | 7/2021 | Zinno et al. |
| 2021/0292824 | A1 | 9/2021 | Zhang et al. |
| 2021/0335004 | A1 | 10/2021 | Zohar et al. |
| 2021/0375021 | A1 | 12/2021 | Starke et al. |

(56) References Cited

U.S. PATENT DOCUMENTS

| | | | |
|---|---|---|---|
| 2021/0383585 A1 | 12/2021 | Zhao et al. |
| 2021/0406765 A1 | 12/2021 | Zhang et al. |
| 2022/0215232 A1 | 7/2022 | Pardeshi et al. |
| 2022/0230376 A1 | 7/2022 | Rozantsev et al. |
| 2022/0254157 A1 | 8/2022 | Fu et al. |
| 2023/0010480 A1 | 1/2023 | Li et al. |
| 2023/0177755 A1 | 6/2023 | Starke et al. |
| 2023/0186543 A1 | 6/2023 | Starke et al. |
| 2023/0237724 A1 | 7/2023 | Starke et al. |
| 2023/0267668 A1 | 8/2023 | Starke et al. |
| 2023/0310998 A1 | 10/2023 | Starke et al. |

FOREIGN PATENT DOCUMENTS

| | | |
|---|---|---|
| CN | 105405380 A | 3/2016 |
| CN | 105825778 A | 8/2016 |
| CN | 110039546 A | 7/2019 |
| JP | 2018-520820 A | 8/2018 |
| JP | 2019-162400 A | 9/2019 |
| WO | WO 2019/184633 A1 | 10/2019 |

OTHER PUBLICATIONS

Anagnostopoulos et al., "Intelligent modification for the daltonization process", International Conference on Computer Vision Published in 2007 by Applied Computer Science Group of digitized paintings.

Andersson et al., "Virtual Texturing with WebGL," Master's thesis, Chalmers University of Technology, Gothenburg, Sweden (2012).

Avenali, "Color Vision Deficiency and Video Games", The Savannah College of Art and Design, Mar. 2013.

Badlani et al., "A Novel Technique for Modification of Images for Deuteranopic Viewers", May 2016.

Belytschko et al., "Assumed strain stabilization of the eight node hexahedral element," Computer Methods in Applied Mechanics and Engineering, vol. 105(2), pp. 225-260 (1993), 36 pages.

Belytschko et al., Nonlinear Finite Elements for Continua and Structures, Second Edition, Wiley (Jan. 2014), 727 pages (uploaded in 3 parts).

Blanz et al., "A morphable model for the synthesis of 3D faces," In Proceedings of the 26th annual conference on Computer graphics and interactive techniques Jul. 1, 1999 (pp. 187-194). ACM Press/Addison-Wesley Publishing Co.

Blanz et al., "Reanimating Faces in Images and Video" Sep. 2003, vol. 22, No. 3, pp. 641-650, 10 pages.

Chao et al., "A Simple Geometric Model for Elastic Deformations", 2010, 6 pgs.

Clavet, "Motion matching and the road to next-gen animation," In Proc. of GDC. 2016 (Year: 2016).

Cook et al., Concepts and Applications of Finite Element Analysis, 1989, Sections 6-11 through 6-14.

Cournoyer et al., "Massive Crowd on Assassin's Creed Unity: AI Recycling," Mar. 2, 2015, 55 pages.

Dick et al., "A Hexahedral Multigrid Approach for Simulating Cuts in Deformable Objects", IEEE Transactions on Visualization and Computer Graphics, vol. X, No. X, Jul. 2010, 16 pgs.

Diziol et al., "Robust Real-Time Deformation of Incompressible Surface Meshes", to appear in Proceedings of the 2011 ACM SIGGRAPH/Eurographics Symposium on Computer Animation (2011), 10 pgs.

Dudash, "Skinned instancing." NVidia white paper(2007).

Fikkkan, "Incremental loading of terrain textures," MS thesis. Institutt for datateknikk og informasjonsvitenskap, 2013.

Geijtenbeek et al., "Interactive Character Animation using Simulated Physics", Games and Virtual Worlds, Utrecht University, The Netherlands, The Eurographics Association 2011, 23 pgs.

Geijtenbeek et al. Interactive Character Animation Using Simulated Physics: A State-of-the-Art Review), Computer Graphics forum, vol. 31, 2012 (Year: 2012), 24 pgs.

Georgii et al., "Corotated Finite Elements Made Fast and Stable", Workshop in Virtual Reality Interaction and Physical Simulation VRIPHYS (2008), 9 pgs.

Habbie et al., "A Recurrent Variational Autoencoder for Human Motion Synthesis", 2017, in 12 pages.

Halder et al., "Image Color Transformation for Deuteranopia Patients using Daltonization", IOSR Journal of VLSI and Signal Processing (IOSR-JVSP) vol. 5, Issue 5, Ver. I (Sep.-Oct. 2015), pp. 15-20.

Han et al., "On-line Real-time Physics-based Predictive Motion Control with Balance Recovery," Eurographics, vol. 33(2), 2014, 10 pages.

Hernandez et al., "Simulating and visualizing real-time crowds on GPU clusters." Computaci6n y Sistemas 18.4 (2014): 651-664.

Holden et al., "Phase-functioned neural networks for character control," ACM Transactions on Graphics (TOG). Jul. 20, 2017;36(4): 1-3. (Year: 2017).

Hu et al., "face recognition by an albedo based 3D morphable model," In Biometrics (IJCB), 2014 IEEE International Joint Conference on Sep. 29, 2014 (pp. 1-8). IEEE.

Hu, "Face Analysis using 3D Morphable Models," Ph.D. Thesis, University of Surrey, Apr. 2015, pp. 1-112.

Irving et al., "Invertible Finite Elements for Robust Simulation of Large Deformation", Eurographics/ACM SIGGRAPH Symposium on Computer Animation (2004), 11 pgs.

Kaufmann et al., "Flexible Simulation of Deformable Models Using Discontinuous Galerkin FEM", Oct. 1, 2008, 20 pgs.

Kavan et al., "Skinning with Dual Quaternions", 2007, 8 pgs.

Kim et al., "Long Range Attachments—A Method to Simulate Inextensible Clothing in Computer Games", Eurographics/ACM SIGGRAPH Symposium on Computer Animation (2012), 6 pgs.

Klein, "Rendering Textures Up Close in a 3D Environment Using Adaptive Micro-Texturing," Diss. Mills College, 2012.

Komura et al., "Animating reactive motion using momentum-based inverse kinematics," Computer Animation and Virtual Worlds, vol. 16, pp. 213-223, 2005, 11 pages.

Lee, Y. et al., "Motion Fields for Interactive Character Animation", University of Washington, Bungie, Adobe Systems, 8 pgs, obtained Mar. 20, 2015.

Levine, S. et al., "Continuous Character Control with Low-Dimensional Embeddings", Stanford University, University of Washington, 10 pgs, obtained Mar. 20, 2015.

Macklin et al., "Position Based Fluids", to appear in ACM TOG 32(4), 2013, 5 pgs.

McAdams et al., "Efficient Elasticity for Character Skinning with Contact and Collisions", 2011, 11 pgs.

McDonnell et al., "Clone attack! perception of crowd variety." ACM Transactions on Graphics (TOG). vol. 27. No. 3. ACM, 2008.

Muller et al., "Meshless Deformations Based on Shape Matching", SIGGRAPH 2005, 29 pgs.

Muller et al., "Adding Physics to Animated Characters with Oriented Particles", Workshop on Virtual Reality Interaction and Physical Simulation VRIPHYS (2011), 10 pgs.

Muller et al., "Real Time Dynamic Fracture with Columetric Approximate Convex Decompositions", ACM Transactions of Graphics, Jul. 2013, 11 pgs.

Muller et al., "Position Based Dymanics", VRIPHYS 2006, Oct. 21, 2014, Computer Graphics, Korea University, 23 pgs.

Musse et al., "Hierarchical model for real time simulation of virtual human crowds." IEEE Transactions on Visualization and Computer Graphics 7.2 (2001): 152-164.

Nguyen et al., "Adaptive Dynamics With Hybrid Response," 2012, 4 pages.

O'Brien et al., "Graphical Modeling and Animation of Brittle Fracture", GVU Center and College of Computing, Georgia Institute of Technology, Reprinted from the Proceedings of Acm Siggraph 99, 10 pgs, dated 1999.

Orin et al., "Centroidal dynamics of a humanoid robot," Auton Robot, vol. 35, pp. 161-176, 2013, 18 pages.

Parker et al., "Real-Time Deformation and Fracture in a Game Environment", Eurographics/ACM SIGGRAPH Symposium on Computer Animation (2009), 12 pgs.

(56) References Cited

OTHER PUBLICATIONS

Pelechano et al., "Controlling individual agents in high-density crowd simulation." Proceedings of the 2007 ACM SIGGRAPH/ Eurographics symposium on Computer animation. Eurographics Association, 2007. APA.
Rivers et al., "FastLSM: Fast Lattice Shape Matching for Robust Real-Time Deformation", ACM Transactions on Graphics, vol. 26, No. 3, Article 82, Publication date: Jul. 2007, 6 pgs.
Ruiz, "Reducing memory requirements for diverse animated crowds." Proceedings of Motion on Games. ACM, 2013.
Rungjiratananon et al., "Elastic Rod Simulation by Chain Shape Matching withTwisting Effect" SIGGRAPH Asia 2010, Seoul, South Korea, Dec. 15-18, 2010, ISBN 978-1-4503-0439-9/10/0012, 2 pgs.
Seo et al., "Compression and Direct Manipulation of Complex Blendshape Models", In ACM Transactions on Graphics (TOG) Dec. 12, 2011 (vol. 30, No. 6, p. 164). ACM. (Year: 2011), 10 pgs.
Sifakis, Eftychios D., "FEM Simulations of 3D Deformable Solids: A Practioner's Guide to Theory, Discretization and Model Reduction. Part One: The Classical FEM Method and Discretization Methodology", SIGGRAPH 2012 Course, Version 1.0 [Jul. 10, 2012], 50 pgs.
Starke et al., "Local motion phases for learning multi-contact character movements." ACM Transactions on Graphics (TOG). Jul. 8, 2020;39(4):54-1 (Year: 2020).
Stomakhin et al., "Energetically Consistent Invertible Elasticity", Eurographics/ACM SIGRAPH Symposium on Computer Animation (2012), 9 pgs.
Thalmann et al., "Crowd rendering." Crowd Simulation. Springer London, 2013. 195-227.
Thalmann et al., "Modeling of Populations." Crowd Simulation. Springer London, 2013. 31-80.
Treuille, A. et al., "Near-optimal Character Animation with Continuous Control", University of Washington, 2007, 7 pgs.
Ulicny et al., "Crowd simulation for interactive virtual environments and VR training systems." Computer Animation and Simulation 2001 (2001 ): 163-170.
Vaillant et al., "Implicit Skinning: Real-Time Skin Deformation with Contact Modeling", (2013) ACM Transactions on Graphics, vol. 32 (n° 4). pp. 1-11. ISSN 0730-0301, 12 pgs.
Vigueras et al. "A distributed visualization system for crowd simulations." Integrated Computer-Aided Engineering 18.4 (2011 ): 349-363.
Wu et al., "Goal-Directed Stepping with Momentum Control," Eurographics/ ACM SIGGRAPH Symposium on Computer Animation, 2010, 6 pages.
Zhang et al., "Mode-adaptive neural networks for quadruped motion control. ACM Transactions on Graphics (TOG)." Jul. 30, 2018;37(4): 1-1. (Year: 2018).

* cited by examiner

602

MOTION-INFERRED PLAYER CHARACTERISTICS

INCORPORATION BY REFERENCE

This application claims priority to U.S. Provisional Application No. 63/584,311, filed on Sep. 21, 2023 and titled "MOTION-INFERRED PLAYER CHARACTERISTICS," the disclosure of which is hereby incorporated by reference in its entirety and for all purposes herein. Any and all applications for which a foreign or domestic priority claim is identified in the Application Data Sheet as filed with the present application are hereby incorporated by reference under 37 CFR 1.57.

TECHNICAL FIELD

The present disclosure relates to video games and more specifically, to generating animation of in-game characters reflecting characteristics of corresponding real-world people.

BACKGROUND

Some video games are directed to gamifying real-world activities. For example, sports-based video games enable a user to play a video game version of a real-world sport, such as soccer (also known as football in many parts of the world), American football, tennis, baseball, etc. Many sports-based video games include likenesses or representations of actual or real-world players, including from real-world professional leagues. In order to include the likenesses of real-world players in a video game, many video game developers apply skins, textures, images, and/or the like representative of the real-world player over an existing model generated based on motion capture data obtained at times from a performer who may not be the actual real-world player.

SUMMARY

The systems, methods and devices of this disclosure each have several innovative aspects, no single one of which is solely responsible for all of the desirable attributes disclosed herein. Details of one or more implementations of the subject matter described in this specification are set forth in the accompanying drawings and the description below.

In some aspects, the techniques described herein relate to a computer-implemented method of generating player animation of a video game character of a video game that mimics movement of a real-world subject corresponding to the video game character, the computer-implemented method including: as implemented by a computing system including one or more hardware processors configured to execute specific computer-executable instructions, accessing volumetric capture animation data for the real-world subject; categorizing each volumetric frame in a plurality of volumetric frames included in the volumetric capture animation data based on an orthogonal feature matrix; grouping the plurality of volumetric frames based on a categorization of each volumetric frame in the plurality of volumetric frames to obtain a set of volumetric frame groupings; creating a set of aggregate volumetric frames by, at least, for each volumetric frame grouping of the set of volumetric frame groupings, creating an aggregate volumetric frame based on volumetric frames included in the volumetric frame grouping; accessing a video game model of the video game character within the video game; creating a set of corresponding in-game animation frames by, at least, for each aggregate volumetric frame in the set of aggregate volumetric frames, creating a corresponding in-game animation frame, wherein the corresponding in-game animation frame includes an animation frame with orthogonal feature matrix values that match orthogonal feature matrix values of the aggregate volumetric frame; and generating a mimic model of the real-world subject by at least determining a difference between the set of aggregate volumetric frames and the set of corresponding in-game animation frames, wherein the mimic model is applied to the video game model of the video game character during execution of the video game to mimic the movement of the real-world subject.

In some aspects, the techniques described herein relate to a computer-implemented method, wherein determining the difference between the set of aggregate volumetric frames and the set of corresponding in-game animation frames includes determining, for each aggregate volumetric frame in the set of aggregate volumetric frames, a difference between joint rotations of a rig included in the aggregate volumetric frame and a rig included in a corresponding in-game animation frame of the set of corresponding in-game animation frames.

In some aspects, the techniques described herein relate to a computer-implemented method, further including filtering the volumetric capture animation data to obtain the plurality of volumetric frames, wherein filtering the volumetric capture animation data includes removing frames that do not satisfy a set of filtering rules.

In some aspects, the techniques described herein relate to a computer-implemented method, wherein grouping the plurality of volumetric frames includes performing a Bayesian inference process on the plurality of volumetric frames to cluster the volumetric frames based on values for the orthogonal feature matrix.

In some aspects, the techniques described herein relate to a computer-implemented method, further including interpolating the plurality of volumetric frames to create missing volumetric frames, the missing volumetric frames corresponding to values of the orthogonal feature matrix associated with less than a threshold number of volumetric frames, wherein the missing volumetric frames are included with the set of aggregate volumetric frames.

In some aspects, the techniques described herein relate to a computer-implemented method, further including smoothing aggregate volumetric frames corresponding to neighboring orthogonal feature matrix values.

In some aspects, the techniques described herein relate to a computer-implemented method, further including: determining that a volumetric frame corresponds to an idiosyncratic representation of the real-world subject; and adjusting a weighting of the volumetric frame to prioritize the volumetric frame when creating the aggregate volumetric frame for the volumetric frame grouping that includes the volumetric frame.

In some aspects, the techniques described herein relate to a computer-implemented method, wherein determining that the volumetric frame corresponds to the idiosyncratic representation of the real-world subject includes accessing a label associated with the volumetric frame.

In some aspects, the techniques described herein relate to a computer-implemented method, wherein the orthogonal feature matrix includes: movement angle, face angle, speed, acceleration, limb phase, and ticks to touch.

In some aspects, the techniques described herein relate to a computer-implemented method, wherein the volumetric capture animation data is based at least in part on volumetric data obtained by a volumetric capture system, and wherein the in-game animation frames are based at least in part on motion capture data.

In some aspects, the techniques described herein relate to a computer-implemented method, wherein a rig associated with a volumetric frame that is associated with the real-world subject includes less bones than a rig associated with the video game model of the video game character.

In some aspects, the techniques described herein relate to a computer-implemented method, further including storing the mimic model in a game data repository for the video game, wherein an amount of storage space to store the mimic model is at least a magnitude smaller than an amount of storage space to store a character model directly generated using the volumetric capture animation data.

In some aspects, the techniques described herein relate to a computer-implemented method, further including: aggregating a set of mimic models including the mimic model to obtain an aggregate mimic model; and associating the aggregate mimic model with a second real-world subject, wherein the computing system lacks access to volumetric capture animation data for the second real-world subject.

In some aspects, the techniques described herein relate to a computer-implemented method, wherein generating the mimic model further includes extrapolating values of the mimic model to determine a value for a boundary condition associated with the orthogonal feature matrix.

In some aspects, the techniques described herein relate to a computer-implemented method, wherein the real-world subject is a human.

In some aspects, the techniques described herein relate to a system including: an electronic data store configured to store volumetric capture animation data for a real-world subject; and a hardware processor of a computing system in communication with the electronic data store, the hardware processor configured to execute specific computer-executable instructions to at least: access the volumetric capture animation data for the real-world subject from the electronic data store; categorize each volumetric frame in a plurality of volumetric frames included in the volumetric capture animation data based on an orthogonal feature matrix; group the plurality of volumetric frames based on a categorization of each volumetric frame in the plurality of volumetric frames to obtain a set of volumetric frame groupings; create a set of aggregate volumetric frames by, at least, for each volumetric frame grouping of the set of volumetric frame groupings, creating an aggregate volumetric frame based on volumetric frames included in the volumetric frame grouping; access a video game model of a video game character within a video game, wherein the video game model corresponds to the real-world subject; create a set of corresponding in-game animation frames by, at least, for each aggregate volumetric frame in the set of aggregate volumetric frames, creating a corresponding in-game animation frame, wherein the corresponding in-game animation frame includes an animation frame with orthogonal feature matrix values that match orthogonal feature matrix values of the aggregate volumetric frame; and generate a mimic model of the real-world subject by at least determining a difference between the set of aggregate volumetric frames and the set of corresponding in-game animation frames, wherein the mimic model is applied to the video game model of the video game character during execution of the video game to mimic movement of the real-world subject.

In some aspects, the techniques described herein relate to a system, wherein determining the difference between the set of aggregate volumetric frames and the set of corresponding in-game animation frames includes determining, for each aggregate volumetric frame in the set of aggregate volumetric frames, a difference between joint rotations of a rig included in the aggregate volumetric frame and a rig included in a corresponding in-game animation frame of the set of corresponding in-game animation frames.

In some aspects, the techniques described herein relate to a system, wherein the hardware processor is further configured to execute the specific computer-executable instructions to at least filter the volumetric capture animation data to obtain the plurality of volumetric frames, wherein filtering the volumetric capture animation data includes removing frames that do not satisfy a set of filtering rules.

In some aspects, the techniques described herein relate to a system, wherein the hardware processor is further configured to execute the specific computer-executable instructions to at least: determine that a volumetric frame corresponds to an idiosyncratic representation of the real-world subject; and adjust a weighting of the volumetric frame to prioritize the volumetric frame when creating the aggregate volumetric frame for the volumetric frame grouping that includes the volumetric frame.

In some aspects, the techniques described herein relate to a system, wherein adjusting the weighting of the volumetric frame increases a probability that the video game displays an animation depicting the video game character performing an idiosyncratic action associated with the real-world subject.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Aspects and advantages of the embodiments provided herein are described with reference to the following detailed description in conjunction with the accompanying drawings. Throughout the drawings, reference numbers may be re-used to indicate correspondence between referenced elements. The drawings are provided to illustrate example embodiments described herein and are not intended to limit the scope of the disclosure. In addition, various features of different disclosed embodiments can be combined to form additional embodiments, which are part of this disclosure. Further, one or more features or structures can be removed or omitted.

DETAILED DESCRIPTION OF CERTAIN EMBODIMENTS

Figure 1:
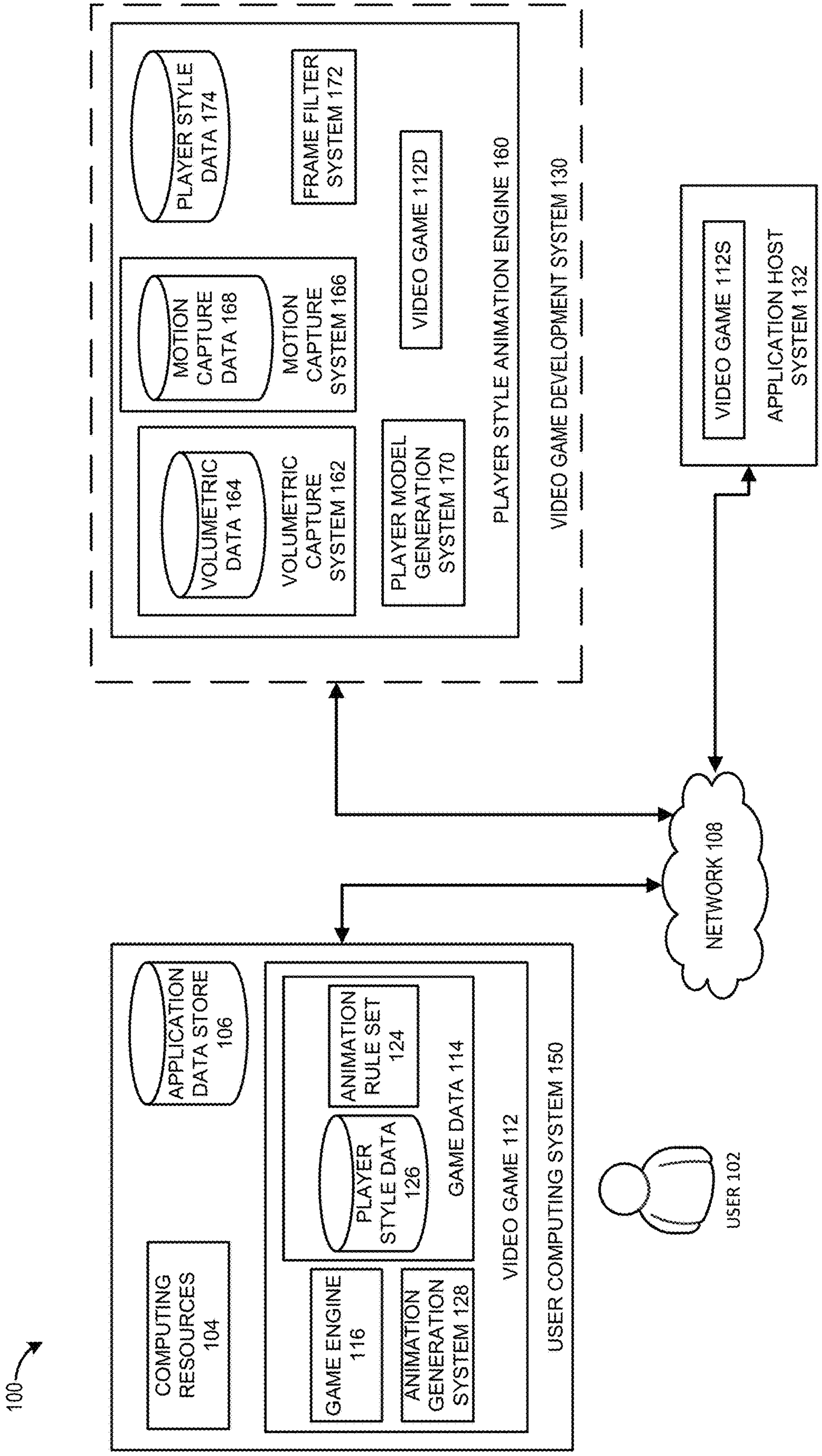
FIG. 1 illustrates aspects of a networked computing environment that can implement one or more aspects of a motion-inferred player characteristics system in accordance with certain aspects of the present disclosure.

The headings provided herein, if any, are for convenience only and do not necessarily affect the scope or meaning of the claims.

INTRODUCTION

Likenesses of real-world players are often included in video games. To include likenesses of the real-world players, skins or other cosmetic features may be applied to models generated by animators. These models often have one style of locomotion, or a style of locomotion selected from a small set (e.g., 3 to 6) of programmed options. However, the diversity of locomotion and/or of play style by real-world players is vast and much more than can be included in the small set of programmed options. This diversity is often due to different shapes of each player (e.g., different heights, weights, leg to torso ratios, etc.). However, even players that are very similar in body shape may move differently due, for example, to training differences or for idiosyncratic reasons. For example, some players may swing their arms across their bodies when running while other players may swing their arms in the direction they are running. Further, some players may have their arms further away from their torso than other players when running. Regardless of the reason for the differences in locomotion, the diversity in locomotion is often much greater than what can realistically be included in a video game due, for example, to space constraints in storing personalized animation data for each player and time constraints in observing and programming locomotion for the number of players that might be represented in a video game. Moreover, real-world players may have other differences in play style beyond diversity in locomotion that can add further complexity in recreating real-world players play style. For example, some players may back pedal, some players may side step, and yet other players may run forwards while turning and looking over their shoulder when a goalkeeper is preparing to punt a ball from the penalty area or 18-yard box.

One method that has been used to create realistic animations is to use cinematic recordings of real-world people and to insert the recordings into the video game. While cinematic recordings may be effective for non-interactive scenes or for scenes with minimal user interaction, such an approach is less feasible for games with high-degree of interactivity, such as sports video games. Sports video games typically give users a lot of control over the in-game characters allowing users to move the characters or players in ways that cannot easily be predicted or that may not even be possible in the real-world. For instance, using a gamepad with forward and backward buttons, a user may tap forward to run forward and then tap backward to immediately cause the player to run backwards. And this could occur regardless of the pose of the character (e.g., right foot up, right foot down, or right foot somewhere between up and down) at the time that the user taps the button. In the real-world, it would not be possible for a player to immediately switch from running forward to running backward without some transition in speed or foot location, etc.

Moreover, some video games implementations of real-world activities may intentionally differ from the corresponding real-world activity to make the game more playable. For instance, a match within many sports can take 2-3 hours to play in the real world. It is typically not desirable for each match in a video game to take 2-3 hours. Thus, video game developers often make changes to the video game to shorten play time. These changes may not be limited to just clock speed, but may also impact motion and stamina of the players in the video game to create an experience that scales to the shorter play time, such as increasing speed, turn rate, and acceleration of players to enable faster movement across the in-game pitch or game arena such that playing the video game may feel like watching or playing the sport in the real world while still completing the video game match in a fraction of the time of the real-world match. These changes in the physics of the in-game players may make using cinematic recordings of real-world players in a video game challenging or unrealistic. Further, real-world players would not be able to move at the rate used in the video game or to maintain the rate. Accordingly, it would not be possible to capture cinematic recordings of the desired motion over a real-world game time period.

Video games may include several models that are generated using motion capture data. The motion capture data may be obtained by using cameras, such as infrared cameras, to capture the movement of actors wearing a motion capture suit. To represent each player (playable or otherwise) in the video game, the model that is closest to the real-world player may be selected and a texture or image may be applied to the model to generate an in-game likeness of the player. In some cases, a programmer, an animator, an artist, or the like may make adjustments, manual or otherwise, to the selected model in an attempt to better match the likeness of the real-world player. For example, the model may be stretched in one or more directions to change the height, girth, or musculature of the model.

At times, motion capture data alone may be insufficient to capture realistic player movement. For example, a motion capture suit can be overly restrictive affecting player motion. Further, the lighting conditions and the fact that an actual real-world game is not being played during the motion capture may affect the realism of the movements of the player. In other words, capturing motion of a player in isolation may not provide for the same realism of movement and action as may occur when an actual real-world game is being played. Moreover, in some cases, a video game may have representations of several thousand real-world players. Thus, in certain instances, it may not only be time-consuming to create a model for each real-world player, but it may not be feasible (e.g., due to time constraints, availability, etc.) to use motion captures for every real-world player that is to be included in a video game.

Some of these obstacles may be overcome or simplified by volumetric capture data that can be obtained from systems that record real-world sporting events using multiple cameras. Using volumetric capture systems, it is unnecessary to schedule time with players to perform the capture process as the data may be obtained during normally scheduled events (e.g., league games). The multi-camera systems used by volumetric capture systems may generate volumetric data associated with each recorded player based on recordings of the players from different angles.

The volumes created of the players may be matched to a skeleton or skeletal animation to create an animation from the video-recorded data. However, occlusion and background movements (e.g., fans jumping in the stands) may cause errors in the animation conversion of the recorded data. Further, typically no matter the amount of filtering or cleaning up of the data performed, the fidelity of the animation created from the volumetric capture system may be lower than that created by motion capture systems because, for example, the skeletal structure, or rig, may have less bones than the skeletal structure, or rig, used in the model created using motion capture data. Thus, while motion capture may provide more fidelity, volumetric capture data may provide more authenticity.

Embodiments of the present disclosure relate to a system that is able to combine motion capture data with volumetric capture data to capture player style information for a player. This player style information or player style data may be used to modify animation models used by a video game to create a more realistic look and feel for a player being emulated by the video game. This more realistic look and feel can enable the game to replicate play style of a player. For example, one soccer player may run with his elbows closer to his body and his forearm may swing across his torso. While another soccer player who is perhaps more muscular may run with his elbows and arms further from his body and his forearms may not cross in front of his torso when running.

As described above, generally a video game has a limited number of models generated from motion capture data due, for example, to storage and time limitations. Each of the included models may differ based on sizes of the models. So, one model may be for short players, a second model may be for average height players, and a third model may be for tall players. Additional models may be included for players of varying muscular or stockiness. Using this plurality of motion capture models to generate the thousands of players may not capture the different run styles of signature movements of certain well-known players. Thus, the models may not capture the difference in running style between the two players in the example described above.

Further, style differences are not limited to just running style. There may be differences in many different characteristics of different players that result in a unique style for that player, or at least a group of players. For example, there may be differences in walking style, in passing style, in jumping style, in celebration style, in reaction to an event, and the like. Moreover, there may be differences in actions of different players in response to an event. For example, some players back pedal while others sidestep in preparation for a goalkeeper punting a ball. As another example, some players place their arms across their body while other players keep their arms against the sides of their torso when jumping to block a free kick. The various differences in player style may result in differences in movements for different events. Moreover, some of the style differences may relate to decision making and not just movement style. For example, some players may celebrate goals with a flashy celebration, while other players may not. As another example, some players might have a particular expression when an event occurs (e.g., giving up a goal, being on the receiving end of a tackle, etc.) while other players may have a different expression or maintain an expression that is agnostic to the occurrence of the event.

Even if it was practical to determine player style data for each player and to generate a personalized model for each player, the amount of storage that would be required to store the personalized data for each player would be impractical. For example, the amount of storage could potentially exceed terabytes of data if not more depending on the degree of realism and the amount of style features to be captured and recreated in the models and the number of players incorporated into the video game.

To simplify discussion, the present disclosure is primarily described with respect to a video game. However, the present disclosure is not limited as such and may be applied to other types of applications. For example, embodiments disclosed herein may be applied to educational applications, or any type of application where it is desirable for animation to reflect a style of a real-world person or subject.

Further, to simplify discussion, the present disclosure is primarily described with response to human subjects, such as soccer players, hockey players, American football players, etc. However, the present disclosure is not limited as such, and embodiments may be applied to any type of subject where it is desired for animation to reflect different real-world subject styles. For example, the present disclosure could be applied to different dog breeds to reflect differences in movement of different dogs.

Example Interactive Computing Environment

FIG. 1 illustrates aspects of a networked computing environment 100 that can implement one or more aspects of a motion-inferred player characteristics system in accordance with certain aspects of the present disclosure. The networked computing environment 100 can include a user computing system 150, a video game development system 130, and application host system 132, and a network 108 that enables one or more system of the networked computing environment 100 to communicate with each other over a wireless or wired network. The user computing system 150 may be operated by a user 102, who may be a customer or end-user, or who may be a tester or developer of the video game 112 executing at the user computing system 150.

Although illustrated as one environment, the networked computing environment 100 may be split into two environments with the video game development system 130 part of one environment (e.g., associated with a game development studio), and the user computing system 150 part of another environment (e.g., associated with customer or end-users). The application host system 132 may be part of one or both environments.

The video game development system 130 may include any system or systems that can be used to help develop the video game 112. The video game development system 130 may include one or more computing systems, and/or one or more hardware processors configured to execute instructions stored on a computer readable medium, such as a hard drive, DVD, or other non-limiting media. Further, the video game development system 130 may include a player style animation engine 160.

The player style animation engine 160 may include any system that can generate animation data that can be used to generate an animation of an in-game subject (e.g., an in-game player or character) that at least partially corresponds to a real-world subject (e.g., a real-world player). The player style animation engine 160 may generate the animation data based on volumetric capture data of the real-world subject and a player or character model generated by the video game 112, or a version of the video game 112 under development, which may be referred to as the video game 112D. The player or character model may be generated using, at least in part, motion capture data.

The player style animation engine 160 may include a volumetric capture system 162, a volumetric data repository 164, a motion capture system 166, a motion capture data repository 168, a player model generation system 170, a frame filter system 172, and a player style data repository 174. The volumetric capture system 162 may include any system that can capture and/or generate volumetric capture data of one or more real-world players performing an activity. For example, the volumetric capture system 162 may record a real-world soccer player playing a match using one or more cameras (not shown). These cameras may be specialized cameras configured to record at particular frame speeds and/or capture particular frequencies within the electromagnetic spectrum. The volumetric capture system 162 may use the recoded images of the real-world soccer player to generate a volumetric model that corresponds to the real-world player. The volumetric model may include a skeletal structure or rig that represents a skeleton of the real-world player. The rig may include as many bones and joints as a human. Alternatively, the rig may be a simplified version of a human skeleton and may include less bones and/or joints than a human or real-world player. The volumetric capture system 162 may store the volumetric capture data at the volumetric data repository 164. The volumetric capture data stored at the volumetric data repository 164 may include images recorded by cameras of the volumetric capture system 162 and/or volumetric models generated by the volumetric capture system 162 based at least in part on the recorded images.

The motion capture system 166 may include any system configured to perform a motion capture process and/or to obtain motion capture data of a motion capture model. The motion capture data may be used to learn the realistic gait of an individual as they move about a motion capture studio. Specific portions of the individual, such as joints or bones, may be monitored during this movement. Subsequently, movement of these portions may be extracted from image or video data of the individual, and/or from inertia-based sensors, such as accelerometers or gyroscopic sensors. This movement may then be translated onto a skeleton or rig for use as an underlying framework of one or more in-game characters. The skeleton or rig may include bones, which may be adjusted based on the motion capture images or video. In this way, the skeleton or rig may be animated to reproduce motion performed by the individual.

As explained above, the motion capture model often differs from the real-world player because, for example, it may not be possible for all real-world players to take the time to assist with the motion capture process. Further, the motion capture process may not be performable during recreation of particular events, such as playing a soccer match.

The motion capture system 166 may store the motion capture data in the data repository 168. Further, the data repository 168 may store one or more models generated using the motion capture data. These models may be created as part of the motion capture process. Alternatively, or in addition, the models may include in-game models generated by the video game 112D using the motion capture data.

The player model generation system 170 may include any system that can generate a model of an in-game character corresponding to a real-world player. In certain embodiments, the model generated by the player model generation system 170 may be a player style model that may reflect real-world player-specific locomotion and/or idiosyncrasies. Because the player style model is intended to more accurately represent locomotion and/or styles of a real-world player than, for example, a model generated by an animator and/or motion capture data of a model, the player style model may be referred to as a mimic model. The player model generation system 170 may generate the player style model or mimic model based on the volumetric capture data stored at the volumetric data repository 164 and an in-game model generated by the video game 112D. This in-game model may be based at least in part on the motion capture data stored at the data repository 168. In some cases, the in-game model may be a modified version of the motion capture data that is modified by an animator, game designer, or the video game 112D itself. In certain embodiments, the player model generation system 170 may generate the player style model or mimic model based on the volumetric capture data stored at the volumetric data repository 164 and the motion capture data stored at the data repository 168.

The frame filter system 172 may include any system that is capable of filtering out particular frames of the volumetric capture data. The frames may be filtered based on one or more filtering rules or filtering criteria. Frames may be filtered because they include noise or inaccuracies introduced during the volumetric capture process. For example, some frames may include unrealistic representations of the real-player, such as an image where the hand of the player is depicted as being within the player's torso. As another example, a frame may depict the player walking in the air. These inaccuracies may occur due, for example, to obstructions (e.g., other players) between the player and the camera. Regardless of the reason for the inaccurate frames, it is desirable to remove them from the volumetric capture data that is used to generate the mimic model. The filter criteria is not limited to removing noisy or inaccurate frames. The filter criteria may be based on any reason that a developer may desired to filter volumetric capture data frames. For example, it may be desirable to remove frames that depict the real-world player when the player is tired because the movement of the player may change where the player is tired. As another example, it may be desirable to remove frames that depict the player during a scrimmage or during a league match because the player may play differently during a scrimmage or a league match compared to during a tournament match.

The user computing system 150 may include an instance of the video game 112 with which a user 102 may interact or play. The user computing system 150 may include or host a video game 112. In some cases, the video game 112 may execute entirely on the user computing system 150. In other cases, the video game 112 may execute at least partially on the user computing system 150 and at least partially on the application host system 132 (e.g., the video game 112S). In some cases, the video game 112 (e.g., the video game 112S) may execute entirely on the application host system 132, but a user may interact with the video game via the user computing system 150. For example, the game may be a massively multiplayer online role-playing game (MMORPG) that includes a client portion executed by the user computing system 150 (or a plurality of user computing systems 150) and a server portion executed by one or more application host systems 132. As another example, the video game 112 may be an adventure game played on the user computing system 150 without interacting with the application host system 132. In yet another example, the video game 112 may be a sports game that can be player at a local user computing system 150, but which may include multiplayer features supported either directly by the video game 112 or by the video game 112S at the application host system 132.

The video game 112 should be understood to include software code that a computing device (e.g., the user computing system 150) can use to provide a game for a user 102 to play. A video game 112 may include software code that informs a user computing system 150 of processor instructions to execute, but may also include data used in the playing of the game, such as data relating to game simulation, rendering, animation, and other game data. In certain embodiments, the video game 112 may include a game engine 116, game data 114, and an animation generation system 128. When executed, the video game 112 configured to generate a virtual environment for a user to interface with the video game 112. It should be understood that the video game 112D and/or the video game 112S may include one or more of the embodiments of the video game 112. Moreover, the video game 112S and the video game 112 may collectively form one video game. For example, the video game 112 may be a client portion and the video game 112S may be a server portion of one video game.

During operation, the game engine 116 executes the game logic, controls execution of the simulation of gameplay, and controls rendering within the video game 112. In some cases, the game engine 116 controls characters, the environment, execution of the gameplay, how the game progresses, or other aspects of gameplay based on one or more stored animation rule sets 124. For example, the game engine 116 can monitor gameplay and detect or determine a current runtime state of the video game 112. Based at least in part on the current runtime state of the game application, the game engine 116 applies an animation rule set 124 to control the characters or the environment. For example, an animation rule set 124 can define actions or motions to be performed by one or more in-game characters.

The game engine 116 may use the animation generation system 128 to control rendering or to generate animation of the in-game character. The animation generation system 128 may use player style data or mimic data stored at the player style data repository 126 to modify an in-game generated model to more accurately represent a real-world player that corresponds to the in-game character represented by the in-game generated model. In some cases, the mimic data may be used to accentuate or highlight idiosyncrasies of the real-world player in the in-game generated model. In some cases, the in-game model may be configured to perform idiosyncratic actions or motions more often than the real-world player may perform the action in the real-world because, for example, the real-world player may be known for the actions or movements.

In some embodiments, the game engine 116 can include a simulation engine and a presentation engine. The simulation engine executes the game logic and controls execution of the gameplay simulation. The presentation engine controls execution of presentation of the gameplay and rendering of frames. In some embodiments, the game engine 116 can execute the functionality of the simulation engine and the presentation engine using different engines and/or processes within the game application.

The simulation engine can control execution of individual virtual components, virtual effects, or virtual objects within the video game 112. The simulation engine can manage and determine character movement, character states, collision detection, derive desired motions for characters based on collisions, or the like. The simulation engine receives user inputs and determines character events, such as actions, collisions, runs, throws, attacks and other events appropriate for the game. The character events can be controlled by character movement streams that determine the appropriate motions the characters should make in response to events. The simulation engine can interface with a physics engine that can determine new poses for the characters. The physics engine can have as its inputs, the skeleton models of various characters, environmental settings, character states such as current poses (e.g., positions of body parts expressed as positions, joint angles or other specifications), and velocities (linear or angular) of body parts and motions provided by a character movement module, which can be in the form of a set of force/torque vectors for some or all body parts. From this information, the physics engine generates new poses for the characters using rules of physics and those new poses can be used to update character states. The game device provides for user input to control aspects of the game according to animation rule sets 124.

The simulation engine can output graphical state data (e.g., game state data or game data 114) that is used by presentation engine to generate and render frames within the video game 112. In some embodiments, each virtual object can be configured as a state stream process that is handled by the simulation engine. Each state stream process can generate graphical state data for the presentation engine. For example, the state stream processes can include emitters, lights, models, occluders, terrain, visual environments, and other virtual objects with the video game 112 that affect the state of the game.

The presentation engine can use the graphical state data to generate and render frames for output to a display within the video game 112. The presentation engine can combine the virtual objects, such as in-game characters, animate objects, inanimate objects, background objects, lighting, reflection, and the like, in order to generate a full scene and a new frame for display. The presentation engine can take into account the surfaces, colors textures, and other parameters of the virtual objects. The presentation engine can then combine the virtual objects (e.g., lighting within the virtual environment and in-game character images with inanimate and background objects) to generate and render a frame.

Animation rule sets 124 may include character control variables. These variables may inform the in-game character's motion. For example, the character control variables may include trajectory information for the in-game character. In this example, the trajectory information may indicate positions of the in-game character (e.g., a current position and or one or more prior positions), velocity of the in-game character (current velocity and or one or more prior velocities), and so on. In some embodiments, the character control variables and user input may be separately weighted and combined.

The user computing system 150 may include hardware and software components for establishing communications over a network 108. For example, the user computing system 150 may be equipped with networking equipment and network software applications (for example, a web browser) that facilitate communications via a network (for example, the Internet) or an intranet. The user computing system 150 may have varied local computing resources, such as central processing units and architectures, memory, mass storage, graphics processing units, communication network availability and bandwidth, and so forth. Further, the user computing system 150 may include any type of computing system. For example, the user computing system 150 may include any type of computing device(s), such as desktops, laptops, video game platforms, television set-top boxes, televisions (for example, Internet TVs), network-enabled kiosks, car-console devices, computerized appliances, wearable devices (for example, smart watches and glasses with computing functionality), and wireless mobile devices (for example, smart phones, PDAs, tablets, or the like), to name a few. In some embodiments, the user computing system 150 may include one or more of the embodiments described below with respect to FIGS. 7 and 8.

The user computing system 150 may further include computing resources 104 configured to execute the video game 112. Moreover, the user computing system 150 may include an application data store 106 that is configured to store the video game 112.

The network 108 can include any type of communication network. For example, the network 108 can include one or more of a wide area network (WAN), a local area network (LAN), a cellular network, an ad hoc network, a satellite network, a wired network, a wireless network, and so forth. Further, in some cases, the network 108 can include the Internet.

Example Mimic Model Generation Process

Figure 2:
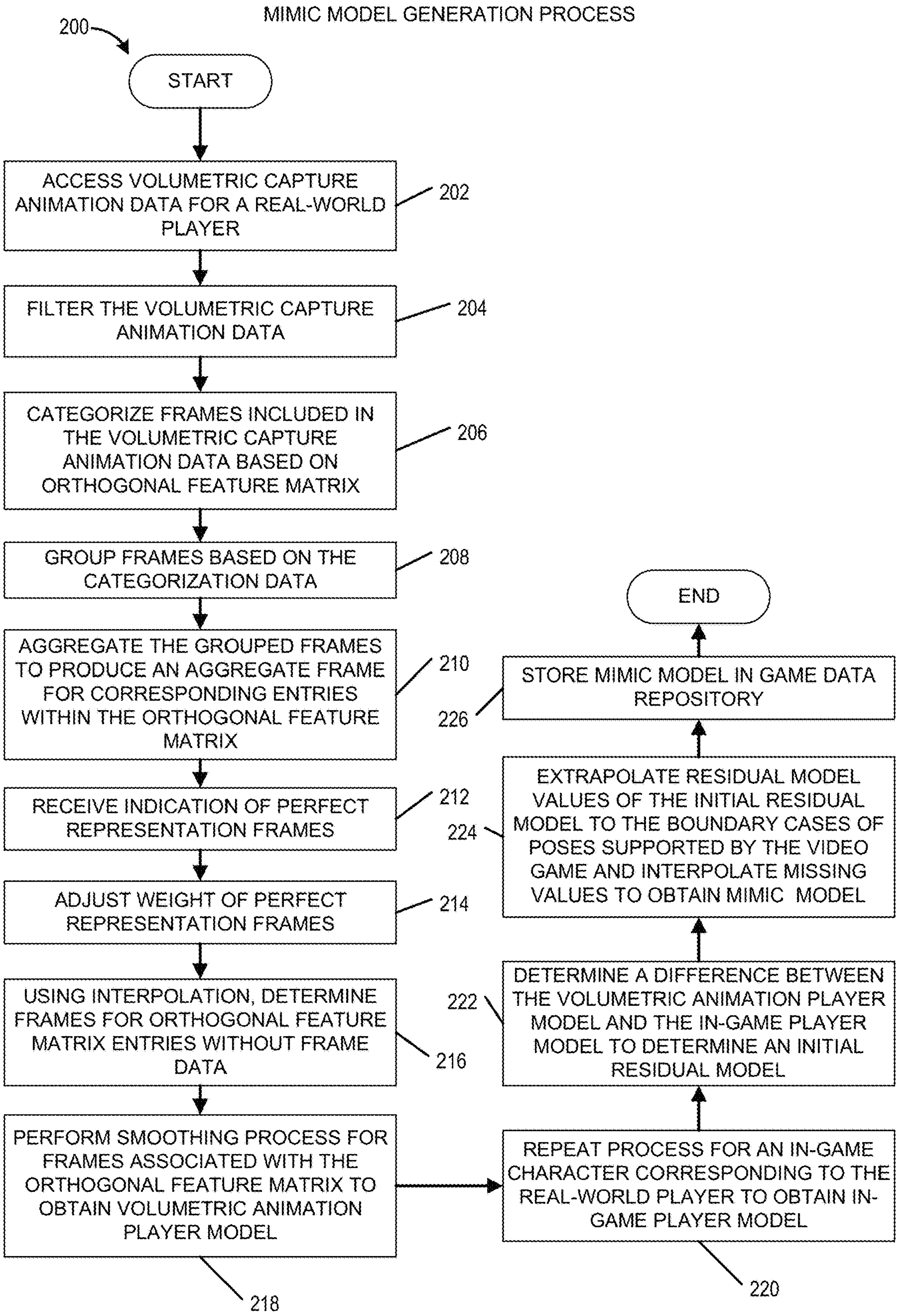
FIG. 2 presents a flowchart of an embodiment of a mimic model generation process in accordance with certain aspects of the present disclosure.

FIG. 2 presents a flowchart of an embodiment of a mimic model generation process 200 in accordance with certain aspects of the present disclosure. The process 200 can be implemented by any system that can generate a mimic model to mimic movement and/or idiosyncrasies of a real-world player that is represented by an in-game model in a video game 112. The process 200, in whole or in part, can be implemented by, for example, a video game development system 130, a player style animation engine 160, a volumetric capture system 162, a motion capture system 166, a player model generation system 170, a frame filter system 172, and the like. Although any number of systems, in whole or in part, can implement the process 200, to simplify discussion the process 200 will be described with respect to particular systems.

The process 200 begins at block 202 where, for example, the player model generation system 170 accesses volumetric capture animation data for a real-world player. The volumetric capture animation data may be accessed from the volumetric data repository 164 and/or may be provided by the volumetric capture system 162. The volumetric capture data may include a set of frames or volumetric frames that depict a volumetric image of the real-world player captured using one or more cameras of the volumetric capture system 162. A volumetric image may include an image that forms a representation of an object (e.g., the real-world player) in three dimensions. The volumetric image may represent the three-dimensional (3D) object (e.g., the real-world player) in a two-dimensional (2D) image.

At block 204, the frame filter system 172 filters the volumetric capture animation data. Filtering the volumetric capture animation data may include performing one or more different filtering processes. In some cases, the block 204 is optional or omitted. In other cases, one or all of the filtering processes described herein are performed. Moreover, the frame filter system 172 may automatically determine filtering processes to perform. In other cases, the frame filter system 172 may perform one or more filtering processes selected by a user (e.g., a game developer or animator).

The frame filter system 172 may perform filtering to remove bad data, bad frames, or undesirable frames. Bad frames may include frames where portions of the real-world player are occluded, such as by another player. Further, bad frames may include frames where the volumetric capture algorithm or process resulted in errors or impossible images, such as an image of the hand of the real-world player being inserted inside the player's torso. In some cases, bad frames may be generated due to water on the camera lens, water on the field that is kicked up as a player runs, or imperfections in the pitch that make the player appear to rise or fall as the player runs. In general, it may be desirable to remove any frames generated based on a non-ideal environment that results in unusual movements and/or the volumetric capture system 162 obtaining or generating non-ideal or bad data.

In some cases, the filtering may be used to remove images that the developer is currently not interested in. For example, the developer may be focused on idiosyncrasies in the real-world player's running or dribbling movements. For instance, the developer may not be interested in movements relating to passing the ball or to jumping to head the ball. In such cases, the frame filter system 172 may be configured to filter out images of the real-world player that are not related to running or dribbling the ball. Further, filtering may be used to remove infrequent or uninteresting movements, such as instances where the real-world player trips and falls.

In certain embodiments, filtering the volumetric capture animation data may include determining a standard deviation for frames included in the volumetric capture animation data. In such cases, the frame filter system 172 may remove frames that are outliers based on the standard deviation and/or how distinct a frame is compared to the mean. The mean of the frame may be determined based on an average value of one or more joints of a skeleton for an image of the real-world player included in the frames of the volumetric capture animation data.

The frame filter system 172 may use a set of filtering rules or criteria to determine frames from the volumetric capture animation data to filter. Frames that do not match or satisfy the set of filtering rules may be removed from the volumetric capture animation data. These rules may relate to errors or bad data, or any other factor for which a developer may desire to filter data. For example, the frame filter system 172 may filter the frames to develop a balance between frames obtained during the first half of a game and a second half of the game. It may be desirable to balance the frames because the number of frames captured for a real-world player between the first half and the second half may differ, and the real-world player's play may differ between first half and second half for a number of reasons (e.g., awareness of less time remaining, score, fatigue, etc.). For instances, in cases where a player does not start a game or is removed before the end of the game, the number of frames captured for the first half and second half may differ.

Another reason to filter frames is to remove frames where a player may begin to tire. When a player tires, the player's movements may change. Thus, it may be desirable to remove later frames or frames where there is an indication of fatigue. Further, if a player picks up an injury, but remains in the game, the movements may change, and it may be desirable to remove such frames. On the other hand, it may be desirable to remove frames where the player is not tired or not injured as the developer may desire to capture how the real-world player moves when tired or injured. In some cases, the process 200 may be performed at least once using frames where the player is not tired and the process 200 may be performed at least once using frames where the player is tired. Thus, in such cases, the filter may differ for the different executions of the process 200.

In certain embodiments, the frame filter system 172 may implement automatic filtering based on certain rules. This automatic filtering may occur without user labelling of frames or user intervention. For example, the rules-based filtering may auto filter frames that occur after a real-world player has players a particular number of minutes, upon detection of an occlusion, a determination of entanglement between players or if multiple players are in the frame, and the like. In some cases, the automatic filtering may remove frames that include gestures that are not part of or desired in the game, such as profanity-related gestures, anger-based expressions, or if crowd throws things on pitch, etc.

In some implementations, the automatic filtering may use machine learning and/or labelling to determine frames to remove. For example, a user may label examples of undesired frames, and the frame filter system 172 may remove frames that are similar to the labelled frames.

At block 206, the player model generation system 170 categorizes frames included in the volumetric capture animation data based on an orthogonal feature matrix. The volumetric capture animation data may be a filtered subset of the volumetric capture animation data obtained at the block 204. The orthogonal feature matrix may include one or more features of the image of the real-world player that can be used to categorize the frame. The orthogonal feature matrix may include values within a defined range for each feature. The values and ranges may depend on the specific feature included in the orthogonal feature matrix. In some cases, the feature included in the orthogonal feature matrix may be determined directly from the frame being evaluated (e.g., position or rotation of a joint). In other cases, the feature may depend on a comparison between frames (e.g., speed, acceleration, etc.). In some cases, the orthogonal feature matrix relates to features of a skeleton or rig of the depiction of the real-world player. In one non-limiting example for a soccer game, the orthogonal feature matrix may include a movement angle, a face angle, a speed, an acceleration, a limb phase, and a ticks to touch for dribbling or trapping a ball.

The movement angle may describe the angle at which the player or the rig corresponding to the player is moving. The movement angle may be determined from the angle of one or more joints in the rig.

The face angle may describe the direction the player is facing or looking. The movement angle and face angle may differ as the user may be facing or looking at a different angle than the player is moving. The face angle may be determined based on a rotation of particular joints within the rig, such as a joint associated with a particular one or more vertebrae (e.g., the third vertebrae) within the spine.

The speed may be determined based on a distance covered between frames by the player. Alternatively, or in addition, the speed may be determined based on a frequency at which one or more joints within the rig have a particular rotation. The frequency with which a joint has a particular rotation may correspond to a speed of movement.

Similarly, the acceleration of the player may be determined based on a change in the distance covered between frames by the player. Alternatively, or in addition, the acceleration may be determined based on a change in a frequency at which one or more joints within the rig have a particular rotation.

The limb phase may include a value corresponding to a position in a cycle for a cyclical movement. The limb phase may be associated with a particular limb, bone, or joint. For example, the limb phase may be associated with a joint in the right leg or foot, such as an ankle joint. The limb phase may be determined based on the joint rotation as the player is walking or running. For example, on a range between 0 and 1, the limb phase may be 0 when the foot is planted, 0.5 when the foot is at its maximum elevation when the player is walking or running, and 1 when the foot is on the ground after being at its maximum elevation. The limb phase may return to 0 when the foot is again planted. Thus, the values 0 and 1 may seem similar, however the joint rotations may differ when the foot is preparing to lift off the ground compared to when the foot is returning to the ground.

The ticks to touch may be a measurement of the distance between the foot and the ball. When the user is far from the ball (e.g., does not have possession), the ticks to touch may be at one boundary value. When the user has possession of the ball, the ticks to touch may represent a distance to the ball.

The orthogonal feature matrix may include more or less of the above example features or axes. Further, the orthogonal feature matrix may include alternative or additional features or axes as part of the matrix. For example, the orthogonal feature matrix may include values for additional joints and/or bones in a rig. As another example, the orthogonal feature matrix may include a distance from a particular point in the skeleton or rig to the ground. This distance may be when the skeleton is in contact with the ground, not in contact with the ground, or both.

In some embodiments, the selection of features or axis to include in the orthogonal feature matrix may be determined by a machine learning algorithm, such as a neural network. The neural network may be used to determine features or axes that have or are most likely to have a minimum or particular degree of impact on generating the mimic model. In some cases, the neural network is used to determine features or axes that have or are most likely to have the most impact on the generating the mimic model.

In some cases, the frames may be categorized or contextualized based on a source of the volumetric capture data. For example, data captured during league play may be categorized separately from data obtained during tournament play. As another example, data captured during club team play may be categorized separately from data obtained during national team play. It may be desirable to separately categorize data from different real-world game play sources because a real-world player may, knowingly or unknowingly, play differently during different types of game play. Some players may play different positions, and some such players may play differently or have different idiosyncrasies depending on the position. Thus, in some cases, it may be desirable to categorize data differently based on the position the real-world player is playing when the volumetric capture animation data is obtained.

In some cases, frames may be categorized based on when the frame or the image associated with the frame was recorded within the game. For example, frames corresponding to the first half may be categorized separately from frames corresponding to the second half.

It should be understood that the present disclosure is not limited to soccer games. The present disclosure may be applied to any type of game that simulates a real-world activity with real-world subjects, human or otherwise. The selection of features in the orthogonal feature matrix may differ when the present disclosure is applied to other types of real-world activities, sports-related or otherwise.

At block 208, the player model generation system 170 groups frames based on the categorization data. Grouping the frames based on the categorization data may result in a set of volumetric frame groupings that includes frames based on volumetric capture animation data that have the same or similar orthogonal feature matrix values. Categorizing the frames based on the orthogonal feature matrix, at the block 206, may include categorizing or labeling each frame based on the values of features within the orthogonal feature matrix for the frame. Each frame with the same values may be grouped together. Alternatively, frames that share particular ranges of values may be grouped together.

Thus, some frames may be within the same group despite values of features within the orthogonal feature matrix for the frames differing. In some embodiments, Bayesian statistics or Bayesian inference may be used to group or cluster frames together.

In some cases, after categorization and grouping of frames included in the volumetric capture animation data, each entry within the orthogonal feature matrix will be associated with one or more frames. However, in some cases, at least one entry in the orthogonal feature matrix may not be associated with a frame or may be associated with less than a threshold number of frames. As explained below, in some such cases, frames may be generated for entries that are not associated with a frame or at least the threshold number of frames.

At block 210, the player model generation system 170 aggregates the grouped frames to produce an aggregate frame for corresponding entries within the orthogonal feature matrix. Aggregating the grouped frames may include blending images together. Alternatively, or in addition, aggregating the grouped frames may include averaging values associated with the joints and/or bones together. For example, a rotational value for an ankle joint may be averaged for each frame that is within a particular group or cluster of frames. Advantageously, in certain embodiments, by grouping and averaging frames, it is possible to compare the volumetric capture animation data with in-game models generated based on motion capture data regardless of whether the frame rates differ. For example, if the frame rate for the volumetric capture system 162 or the cameras of the volumetric capture system 162 is higher than the frame rate for the in-game models of the video game 112D, the frames may still be compared due to the grouping and aggregating of frames to produce a single comparison frame for the volumetric capture data, and a single comparison frame for the in-game model (at the block 220 described below) for particular entries within the orthogonal feature matrix.

At block 212, the player model generation system 170 receives an indication of a perfect representation frame, or a set of perfect representation frames. A perfect representation frame may include a frame that depicts a real-world player performing a motion or an idiosyncratic action that is specific to the player. The motion or action may be something that only the real-world player does or may be something that, while not unique to the real-world player, is performed by very few players. In other words, the perfect representation frame may depict the real-world player performing a motion or action that is recognized by the public, or at least fans of the real-world player, as being something that the real-world player is known to do. In some cases, the perfect representation frame may depict a motion or action that the real-world player always performs or performs often. In other cases, the motion or action depicted may not be performed frequently (e.g., may be performed 10 percent or less of the time when the opportunity arises to perform the action), but the motion or action may be associated with the player. For example, a player with a unique scoring celebration may have a perfect representation frame (or set of perfect representation frames) matching or corresponding to the scoring celebration. As another example, a player with a unique or rare running style may have a perfect representation frame (or set of perfect representation frames) matching or corresponding to that running style.

The indication of the perfect representation frame may be received from a user that labels the frames or from a data store that includes labels generated by the user. Alternatively, or in addition, the perfect representation frames may be determined by a machine learning algorithm and/or statistical analysis that determines a frequency of motions or actions by the real-world player based on the volumetric capture data.

At block 214, the player model generation system 170 adjusts a weight of the perfect representation frames. In some embodiments, the weight of the perfect representation frames is increased to prioritize or to cause the perfect representation frames to have a greater impact when determining motion or actions of the in-game player generated based on the volumetric capture data. Adjusting the weight of the perfect representation frames may increase the probability that particular actions or movements are depicted during in-game animation. Thus, it is possible to adjust the frequency of idiosyncratic movements or actions that a real-world player may be known for. In certain embodiments, the operations associated with the block 212 and the block 214 may be optional or omitted.

At block 216, the player model generation system 170, using interpolation, determines frames for orthogonal feature matrix entries without frame data. In some embodiments, the operations of the block 216 may be performed for entries with less than a threshold amount of frame data. In some such cases, the interpolated frames may be aggregated with the frames that exist for the entry within the orthogonal feature matrix.

At block 218, the player model generation system 170 performs a smoothing process for frames associated with the orthogonal feature matrix to obtain a volumetric animation player model. The volumetric animation player model may include quaternions or joint rotation values for each entry within the orthogonal feature matrix. The smoothing process may include averaging values of the joints of the rigs between neighboring frames or aggregate frames of the orthogonal feature matrix. Neighboring frames may include frames associated with values in the orthogonal feature matrix that are consecutive. For example, suppose that speed is measured between 0 and 1 in increments of 0.01 with 0 being associated with minimum speed and 1 being associated with maximum speed. In such a case, assuming that all other values within the orthogonal feature matrix are the same, a frame associated with the speed 0.5 may be neighbors with a frame associated with the speed 0.51.

At block 220, the player model generation system 170 repeats one or more of the operations associated with the blocks 202-218 for a corresponding in-game character within the video game 112 to obtain an in-game player model. In other words, the player model generation system 170 may obtain frames for an in-game character corresponding to the real-world player. The frames may be categorized and grouped based on the orthogonal feature matrix. The player model generation system 170 may determine quaternions or joint rotation values for each entry within the orthogonal feature matrix based on frames of animation generated for the in-game model.

The in-game character may be a model generated using motion capture or based on a model generated using motion capture. In some cases, the in-game character may include adjustments made by a user (e.g., a developer) to a model generated using motion capture. The in-game character may be represented by a model associated with a particular real-world player. Alternatively, the model may be a generic model applied to a set of real-world players. In some cases, the generic model may have at least some personalization to make it correspond more closely to a real-world player. This personalization may be based on developer settings rather than the volumetric capture system 162. In some cases, the video game 112D may have multiple generic models (e.g., a tall model, a thin model, a stocky model, etc.) with different real-world players being associated with different generic models. The block 220 may include selecting the model that corresponds to the real-world player. Operations performed with respect to the volumetric capture animation data may be performed with respect to the in-game character or representative model to obtain the in-game player model.

In certain embodiments, the block 220 may include creating a set of corresponding in-game animation frames for a set of aggregate grouped frames created from the volumetric capture animation data. For example, for each aggregate frame, the player model generation system 170 can generate an animation frame using the in-game model that has the same orthogonal feature matrix values at the aggregate frame. The in-game model in the generated frame may have the same orthogonal feature matrix values as the volumetric model of the real-world player depicted in the aggregate frame, but the rig for the in-game model may have different quaternion values for joints than the rig for the model in the aggregate frame.

At block 222, the player model generation system 170 determines a difference between the volumetric animation player model and the in-game player model to determine an initial residual model. The initial residual model may be a delta model that includes a delta or difference between each value within the volumetric animation player model and the in-game player model. The values within the volumetric animation player model and the in-game player model may be quaternions or rotations of joints within a rig of the models. Thus, the initial residual model may include a difference in values between the joint rotations of the volumetric animation player model and the in-game player model.

At block 224, the player model generation system 170 extrapolates residual model values of the initial residual model to the boundary cases of poses supported by the video game to obtain a mimic model. In some cases, it may be desired that the in-game player of the video game 112D may have a greater range of motion or greater movement capability than the real-world player (e.g., higher jumps or greater height to a leg kick, etc.). In other cases, the most extreme movements of a real-world player may happen relatively infrequently (e.g., maximum speed on a real-world player's best day, etc.). In such cases, the boundary cases may be greater or more extreme than what is captured by the volumetric capture animation data, or the volumetric capture animation data may not include sufficient examples of boundary cases for determining the initial residual model. Regardless of the reason, interpolation may be utilized to extend the initial residual model to include desired boundary cases for the representation of the real-world player within the video game 112. In some embodiments, the block 224 may include attenuating and/or smoothing of extrapolated values.

In some cases, the block 224 may include interpolating missing values in the orthogonal feature matrix. In some embodiments, the block 224 may be optional or omitted. In such cases, the initial residual model may be the mimic model.

At block 226, the player model generation system 170 stores the mimic model in a game data repository. For example, the mimic model may be stored at the player style data repository 174 and/or the player style data repository 126. The mimic model can be a lookup table that includes adjustments to an in-game player or corresponding model thereof such that the in-game player more closely reflects the movements or actions of the corresponding real-world player. During execution of the video game 112, the game engine can lookup the adjustment values in the mimic model for a particular set of orthogonal feature matrix values matching the particular in-game state for the in-game player. The game engine may then apply the adjustment values to the in-game model for the player or in-game character to more accurately match or mimic the real-world player. The adjustment values may be joint rotations, or adjustment to joint rotations for the in-game model for the player or in-game character.

Advantageously, the mimic model may use relatively little memory and significantly less memory (e.g., several magnitudes less memory) than individual generated player-models for each real-world player. Further, the process of generating mimic models may take significantly less time than generating individualized in-game models for each real-world player. For example, generating mimic models for thousands of players can be performed within 2 days or less where it can take months to create personalized models for ten real-world players or so without using the processes described herein.

In some embodiments, a set of mimic models of particular players (e.g., players with similar body types, such as players of the same height and/or weight) can be aggregated. Advantageously, an aggregated mimic model can be applied to models of real-world players where volumetric capture data does not exist (e.g., for new real-world players). In some cases, a particular mimic model of a real-world player that is similar to a second real-world player can be applied to the second real-world player (e.g., without aggregating mimic models).

In certain embodiments, the process 200 may be repeated, at least in part, over time or as more data (e.g., additional volumetric capture animation data) is obtained. In some such embodiments, more recently obtained volumetric capture animation data may be weighted more than older volumetric capture animation data. Advantageously, by weighting more recent data, changes in the real-world player due to age, weight, training or skill level, and the like may be reflected by the mimic model generated by the process 200. In some cases, the volumetric capture animation data may be weighted based on the source of the data (e.g., whether the data was obtained during a friendly match or a league match).

Further, the process 200 may be repeated or performed multiple times using different data. For example, volumetric capture animation data associated with UEFA Champions League matches or fixtures may be separated from volumetric capture animation data associated with Premier League matches or fixtures. The process 200 may be performed separately for the UEFA Champions League and the Premier League data resulting in two separate mimic models for a real-world player. Advantageously, for real-world players who play differently when playing in the UEFA Champions League versus the Premier League, a soccer game using the mimic models can be configured to reflect the differences in the player's style depending on the match being simulated or played by a user playing the video game 112. As another example, the process 200 may be performed using data obtained when the real-world player is determined to have a minimum amount of energy and the process 200 may be repeated using data obtained when the real-world player is determined to be tired or have less than the minimum amount of energy. Thus, the video game 112 can use a different mimic model for when the in-game player is tired than when the in-game player is not tired or is less-tired.

The description of the process 200 above describes the categorizing, grouping, aggregating, and comparing of frames. It should be understood that each of these operations may be with respect to a model of a player depicted in the frames. For example, aggregating a set of frames may refer to aggregating the model depicted in the frames by, for example, averaging rotation values for joints of the model.

Example Player Style Animation Process

Figure 3:
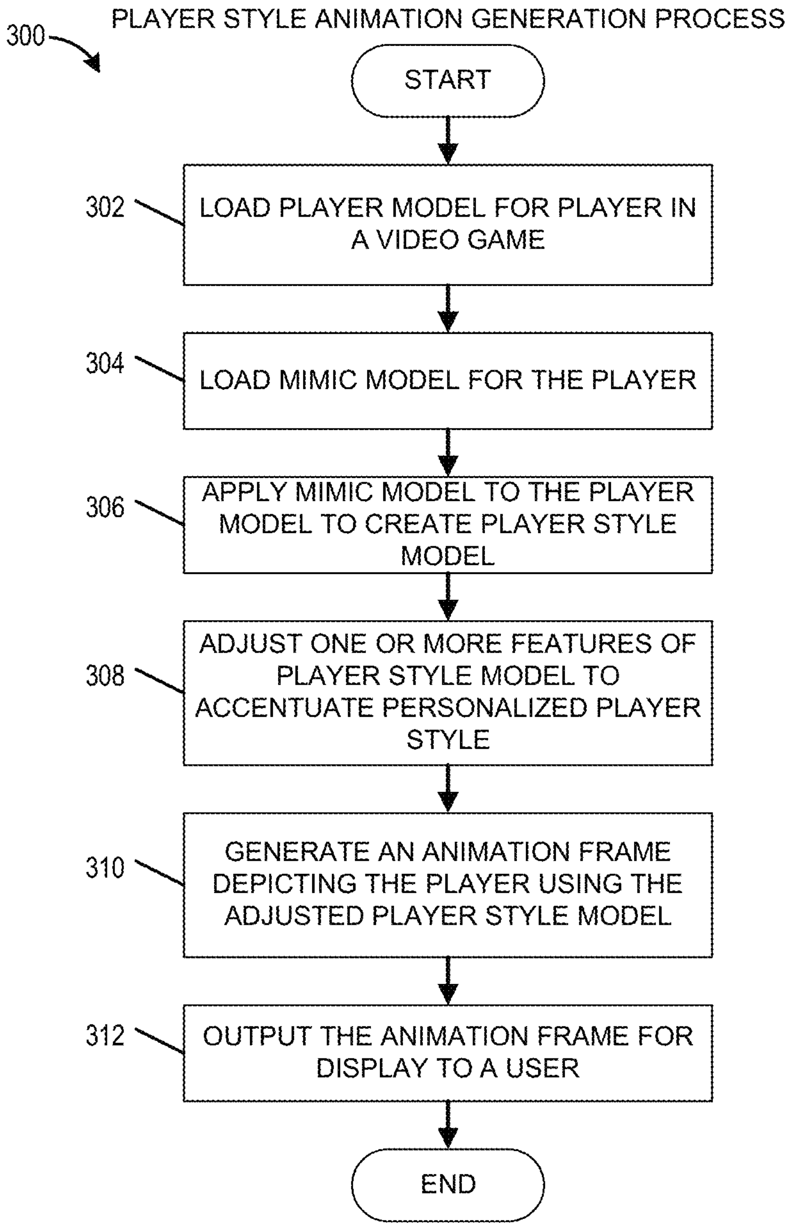
FIG. 3 presents a flowchart of an embodiment of a realistic player style animation generation process in accordance with certain aspects of the present disclosure.

FIG. 3 presents a flowchart of an embodiment of a player style animation generation process 300 in accordance with certain aspects of the present disclosure. The player style animation generation process 300 generates a more realistic animation compared to other processes because, for example, it combines animation generated from a model with volumetric capture data of a real-world player. Although the model may be a real-world subject, restrictions in motion capture technology and the selection of a model who is not the real-world player may impact the realism of the animation. Embodiments of the present disclosure address these restrictions by combining a motion-capture based animation model with a volumetric capture animation data based animation model.

The process 300 can be implemented by any system that can generate animation that mimics a movement or locomotion style of a real-world player. Moreover, embodiments of the process 300 can be used to cause an in-game player or character to mimic idiosyncrasies of a corresponding real-world player. The process 300, in whole or in part, can be implemented by, for example, a video game 112, an animation generation system 128, an animation rule set 124, a game engine 116, computing resources 104 (e.g., a hardware processor), or any other system that can execute instructions of a video game 112. Although any number of systems, in whole or in part, can implement the process 300, to simplify discussion the process 300 will be described with respect to particular systems.

The process 300 may be implemented when a user 102 is playing an instance of the video game 112. Moreover, the user 102 can configure whether the game engine 116 performs the process 300 or omits the process 300.

The process 300 begins at block 302 where, for example, the game engine 116 loads a player model for the video game 112. The player model may correspond to a real-world player. The player model may be one of a set of generic models where each generic model is associated with a different set of players, such as tall players, thin players, stocky players, etc. Alternatively, or in addition, the player model may include at least some personalization. This personalization may be visual or relate to abilities (e.g., speed) of the player. In some cases, the player model may uniquely correspond to the real-world player based on developer or animator adjustments to the in-game model.

At block 304, the game engine 116 loads a mimic model for the player. The mimic model may be loaded from the player style data repository 126. In some cases, the game engine 116 may load a particular mimic model based on the game context. For example, the game engine 116 may load one mimic model if the user selects to play a league match and the game engine 116 may load a different mimic model if the user selects to play a national team match. Moreover, the game engine 116 may automatically load or modify which mimic model is loaded based on an in-game context or state of the in-game player. For example, over time the in-game player may get tired within the context of the video game 112. In such cases, the game engine 116 may change the mimic model that is loaded or active at a particular point in time within the video game 112, or the match, based on the level of fatigue of the in-game player. For non-binary properties, a value within the mimic model may be within a value range. For example, fatigue may be a value within the range of 0 to 1, with 0 being no fatigue, 1 being maximum fatigue, and values in between being associated with varying levels of fatigue depending on how close the value is to 0 or 1. In some implementations, instead of or in addition to associating multiple mimic models with an in-game player, the mimic model may include additional axes or features within the matrix that is the mimic model. These additional axes maybe used to modify other values within the matrix. For example, an additional axis may include a weight or scaler value that is associated with a time (e.g., an elapsed time within the match or fixture). As the time elapses, the weight or scaler value within the axis may change. This variable weight value may be applied to one or more axes within the matrix to modify their impact on the in-game player. For instance, the variable weight value may be applied to the fatigue axis to modify the level of fatigue for the in-game player over time. Moreover, the weight value may be determined by comparing a determined fatigue level for the real-world player that is based on the volumetric capture animation data and a fatigue level applied to an artist or developer generated in-game model developed from motion capture data. Advantageously, in certain embodiments, because the process 300 is performed at run-time rather than during development of the video game 112, the use of the mimic model can be turned on or off during gameplay. Thus, the user 102 can turn off the personalized player style models using the mimic model of the present disclosure before, during, or after each match as the user 102 so desires without affecting the gameplay.

As explained with respect to the process 200, in some cases, a mimic model may not exist for a particular real-world player due, for example, to a lack of volumetric capture animation data for that player. In such cases, the block 304 may include loading a generic mimic model. This generic mimic model may not be specific to the real-world player, but may share certain characteristics with the real-world player, such as relative body size. Advantageously, in certain embodiments, applying a generic mimic model created from other real-world players may result in smoother or less robotic looking animation than an in-game model generated without using features disclosed herein.

At block 306, the game engine 116 applies the mimic model to the player model to create a player style model. Applying the mimic model to the player model may be a frame-by-frame process. In other words, the in-game player model generated by the animation generation system 128 using the animation rule set 124 may be adjusted each frame using the mimic model. Adjusting the in-game player model may include adjusting one or more joint rotations based on values within the mimic model. The particular values in the mimic model may be selected based on a state of the in-game player at each frame. This state may correspond to orthogonal feature matrix values. In some cases, the mimic model may be a lookup table that includes adjustments for one or more joint rotations at each entry in the lookup table. The game engine 116 may use orthogonal feature matrix values as the key to the lookup table to determine the adjustments for the one or more joint rotations.

At block 308, the game engine 116 adjusts one or more features of the player style model to accentuate a personalized player style. For example, the player style model may be adjusted to emphasize a movement or action 30%, 50%, 75%, etc. more often than in the real-world. Accentuating the personalized player style may enable idiosyncratic movements or actions to happen more often during gameplay than may happen in the real-world. Advantageously, causing idiosyncratic movements of actions to happen more often may enable the user 102 to observe actions that the real-world player is known for more often giving the user 102 a sense that the user 102 is playing with a representation of the real-world player. In certain embodiments, the block 308 may be optional or omitted. For example, the accentuation of the personalized player style may occur as part of the process 200 by, for example, the weighting of perfect representation frames.

At block 310, the game engine 116 generates an animation frame depicting the player or the in-game model using the adjusted player style model. In cases where the block 308 is optional or omitted, the block 310 may use the player style model created at the block 306.

At block 312, the game engine 116 outputs or causes to be output the animation frame for display to a user 102.

Although much of the present disclosure relates to idiosyncratic motions or movement style, it should be understood that embodiments herein can be applied to other idiosyncratic actions. For instance, embodiments disclosed herein can be applied to real-world player decision-making. For example, suppose the goalkeeper saves a shot and is holding the ball. In such a case, the mimic model may be used to select whether a field player stares at the goal for a few seconds, backpedals immediately in anticipation of a punt, sidesteps, throws his or hands up in frustration, or performs some other action. As another example, the mimic model may be used to determine a type of goalscoring celebration an in-game player performs based on how the mimic model indicates that the real-world player is most likely to celebrate, in general or under certain conditions (e.g., winning goal, inconsequential goal, club team fixture goal, national team fixture goal, etc.). Further, generating the mimic model may be used to determine a speed or acceleration adjustment of a player by comparing the real-world player's speed or acceleration to that of the in-game model.

Example Use Cases

Figure 4:
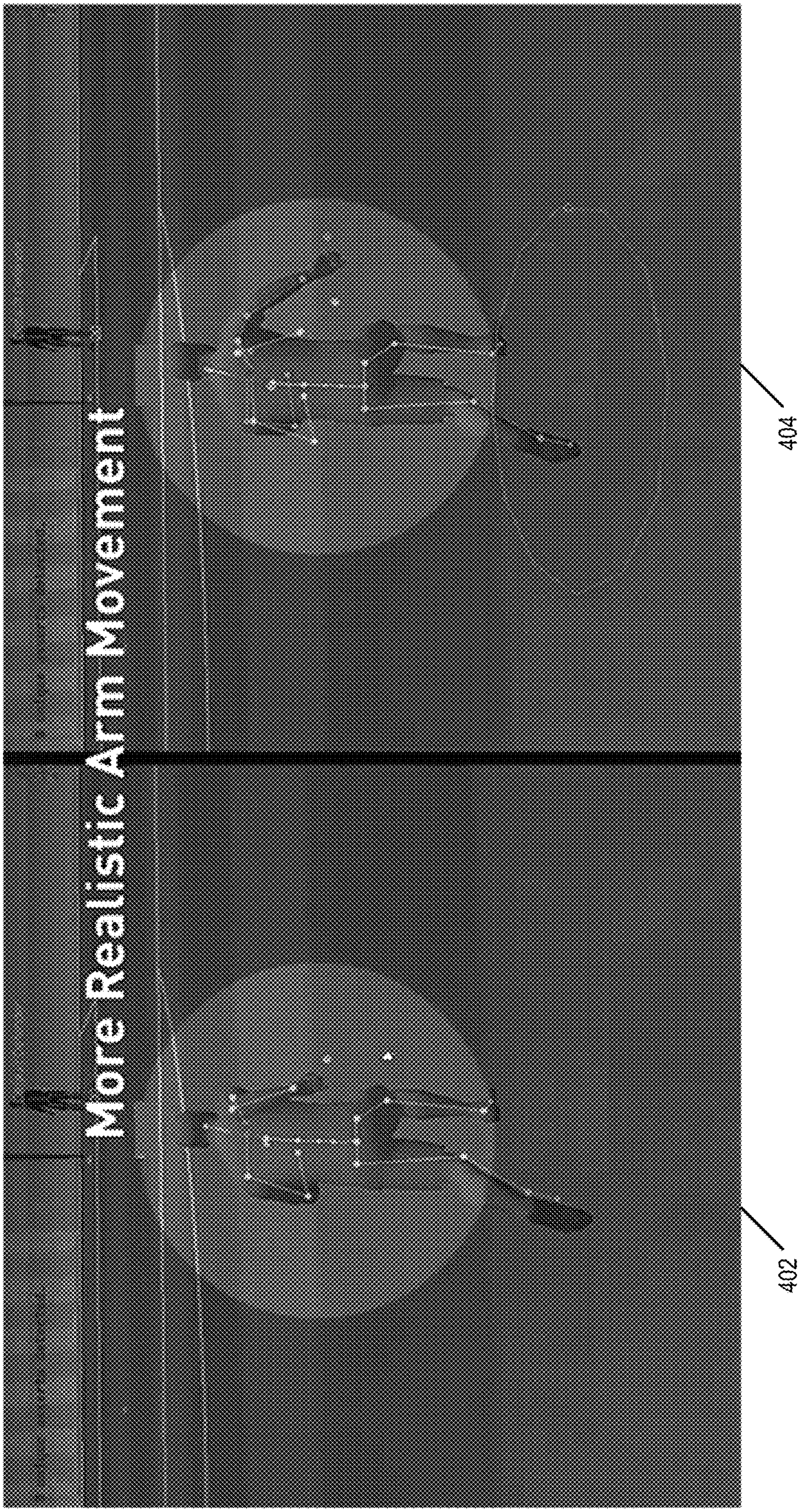
FIG. 4 illustrates a first comparison of an animation model of a soccer player generated using embodiments disclosed herein to an animation model of the soccer player generated without using embodiments disclosed herein.
Figure 5:
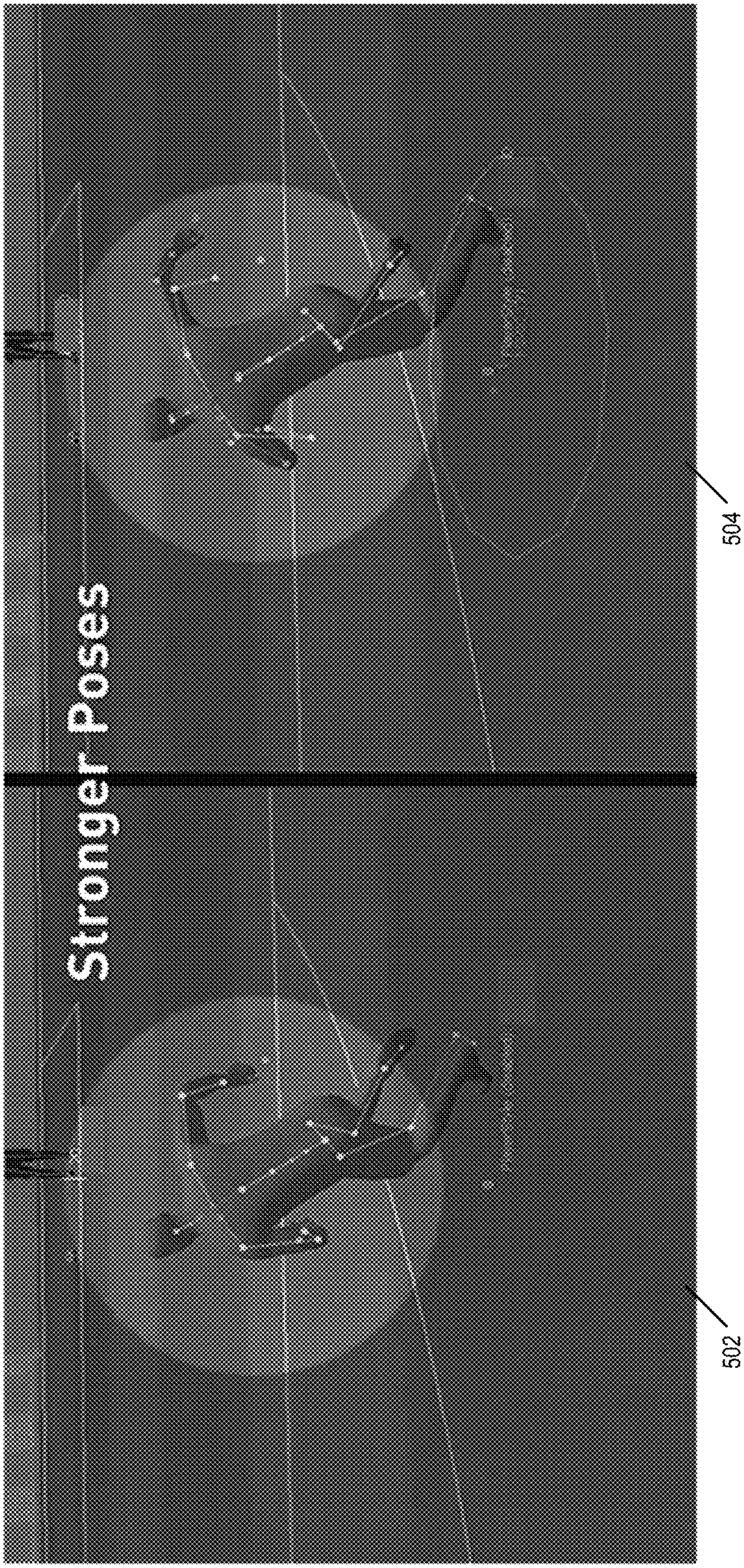
FIG. 5 illustrates a second comparison of an animation model of a soccer player generated using embodiments disclosed herein to an animation model of the soccer player generated without using embodiments disclosed herein.
Figure 6:
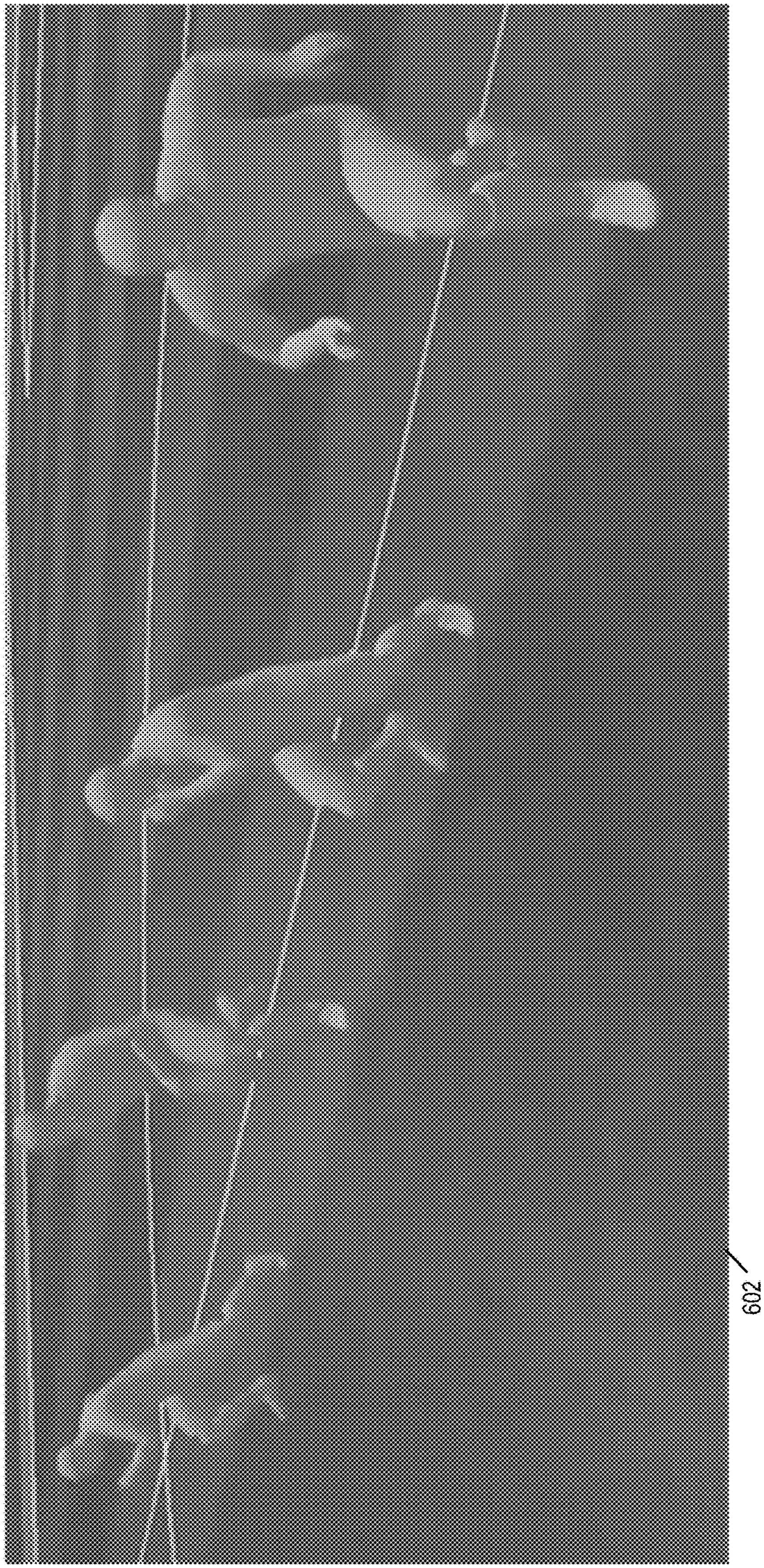
FIG. 6 illustrates a comparison of animation models for different soccer players generated using embodiments disclosed herein.

FIGS. 4-6 illustrate some non-limiting example models created during game development of. As previously explained, the present disclosure may be applied to other sports or activities and are not limited to the depicted examples.

FIG. 4 illustrates a first comparison of an animation model of a soccer player (Player A) generated using embodiments disclosed herein to an animation model of the soccer player generated without using embodiments disclosed herein. Although unnamed in the present disclosure, Player A is a real-world player whose mimic model was generated during game development and based on recordings of matches by cameras of a volumetric capture system. The image 402 on the left depicts an in-game model (without textures or paint) that is a generic representation of Player A for the soccer video game. The image 402 includes a rig for the model.

The image 404 on the right depicts an in-game model that applies a mimic model created for Player A to the generic in-game model. As can be seen by comparing image 404 with image 402, the model in the image 404 has arms that are spread further from the torso, which is more reflective of Player A's real-world running style. The change in the model is can also be seen by comparing the rig of the model that has been modified using the mimic model with the rig of the original model. The rig of the updated mimic model is within the depicted volumetric model and the original rig no longer is fully contained by the volumetric model. For example, the left elbow and the right wrist of the original rig is outside of the model depicted in the image 404. Accordingly, as can be seen by comparing the image 402 with the image 404, using the processes described herein, a more realistic arm movement for Player A can be created.

FIG. 5 illustrates a second comparison of an animation model of Player A generated using embodiments disclosed herein to an animation model of Player A generated without using embodiments disclosed herein. The images depicted in FIG. 5 are of the same real-world player as the images of FIG. 4 with the image 502 on the left depicting the generic in-game model of Player A, and the image 504 on the right depicting the mimic model adjusted model of Player A. Again, the image 504 illustrates both the original rig (also illustrated in image 502) and the modified rig that is modified using the mimic model generated for Player A. As can be seen by comparing the image 502 and the image 504, using the mimic model as described herein, a stronger pose can be generated that is more reflective of Player A's real-world run style.

FIG. 6 illustrates a comparison of animation models for different soccer players generated using embodiments disclosed herein. The models in FIG. 6 are each in-game player models (without texture and paint) that correspond to four real-world players. As discussed with respect to FIG. 4, the players depicted in FIG. 6, although unnamed in the present disclosure, are real-world players whose mimic models was generated during game development and based on recordings of matches by cameras of a volumetric capture system. Starting from the left and going towards the right side of the image 602 are depicted Player B, Player A (who is the same Player A as in FIGS. 4 and 5), Player C, and Player D. Although all four players start at the midfield line and are programmed to run towards the goal, it can be seen that each player has a different motion and is at a different point in the run animation due, in part, to application of the individualized mimic model for each player to the in-game generated model. In the illustrated example, the mimic model has not adjusted the speed or acceleration of any of the players. However, in certain embodiments, it is possible to use the features disclosed herein to determine a personalized speed or acceleration for each player. By using the mimic models described herein, each player within the soccer game can be made to more accurately reflect his or her real-world counterpart. Further, the generation of the model can be performed in a fraction of the time and using a fraction of memory compared to generating individualized personalized models without the benefits of the processes described herein.

Overview of Computing System

Figure 7:
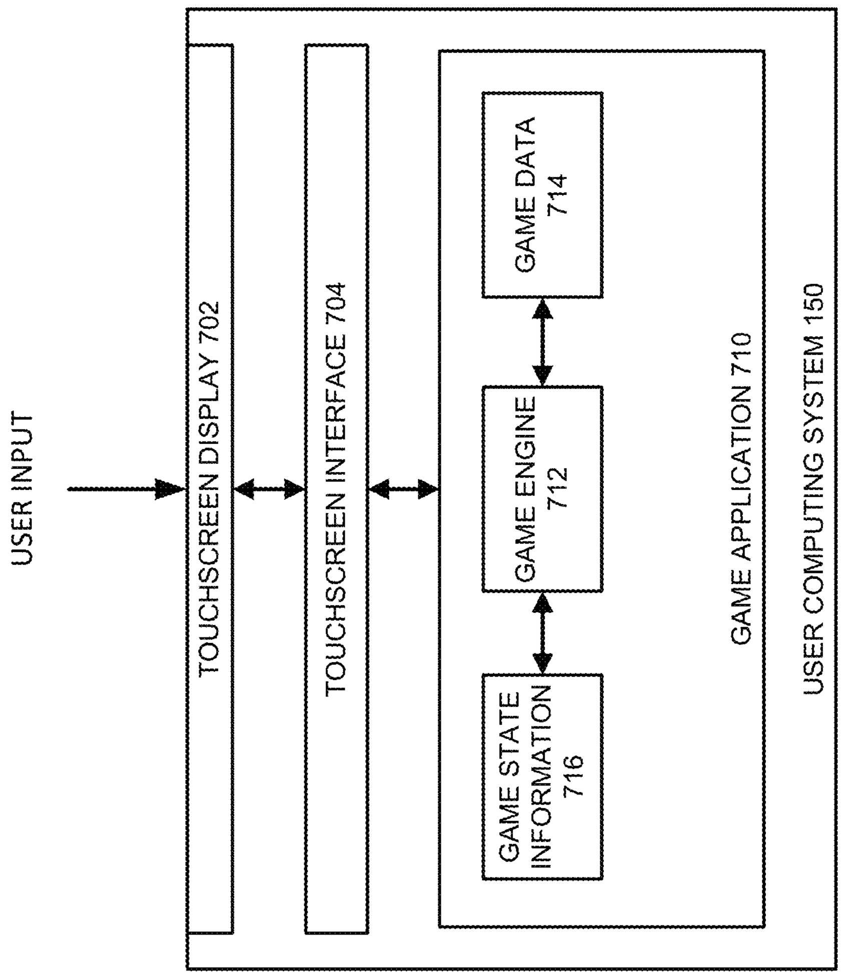
FIG. 7 illustrates an embodiment of a user computing system in accordance with certain aspects of the present disclosure.

FIG. 7 illustrates an embodiment of a user computing system 150, which may also be referred to as a gaming system. As illustrated, the user computing system 150 may be a single computing device that can include a number of elements. However, in some cases, the user computing system 150 may include multiple devices. For example, the user computing system 150 may include one device that includes that includes a central processing unit and a graphics processing unit, another device that includes a display, and another device that includes an input mechanism, such as a keyboard or mouse.

The user computing system 150 can be an embodiment of a computing system that can execute a game system. In the non-limiting example of FIG. 7, the user computing system 150 is a touch-capable computing device capable of receiving input from a user via a touchscreen display 702. However, the user computing system 150 is not limited as such and may include non-touch capable embodiments, which do not include a touchscreen display 702.

The user computing system 150 includes a touchscreen display 702 and a touchscreen interface 704, and is configured to execute a game application 710. This game application may be the video game 112 or an application that executes in conjunction with or in support of the video game 112, such as a video game execution environment. Although described as a game application 710, in some embodiments the game application 710 may be another type of application that may have a variable execution state based at least in part on the preferences or capabilities of a user, such as educational software. While user computing system 150 includes the touchscreen display 702, it is recognized that a variety of input devices may be used in addition to or in place of the touchscreen display 702.

The user computing system 150 can include one or more processors, such as central processing units (CPUs), graphics processing units (GPUs), and accelerated processing units (APUs). Further, the user computing system 150 may include one or more data storage elements. In some embodiments, the user computing system 150 can be a specialized computing device created for the purpose of executing game applications 710. For example, the user computing system 150 may be a video game console. The game applications 710 executed by the user computing system 150 may be created using a particular application programming interface (API) or compiled into a particular instruction set that may be specific to the user computing system 150. In some embodiments, the user computing system 150 may be a general-purpose computing device capable of executing game applications 710 and non-game applications. For example, the user computing system 150 may be a laptop with an integrated touchscreen display or desktop computer with an external touchscreen display. Components of an example embodiment of a user computing system 150 are described in more detail with respect to FIG. 8.

The touchscreen display 702 can be a capacitive touchscreen, a resistive touchscreen, a surface acoustic wave touchscreen, or other type of touchscreen technology that is configured to receive tactile inputs, also referred to as touch inputs, from a user. For example, the touch inputs can be received via a finger touching the screen, multiple fingers touching the screen, a stylus, or other stimuli that can be used to register a touch input on the touchscreen display 702. The touchscreen interface 704 can be configured to translate the touch input into data and output the data such that it can be interpreted by components of the user computing system 150, such as an operating system and the game application 710. The touchscreen interface 704 can translate characteristics of the tactile touch input touch into touch input data. Some example characteristics of a touch input can include, shape, size, pressure, location, direction, momentum, duration, and/or other characteristics. The touchscreen interface 704 can be configured to determine the type of touch input, such as, for example a tap (for example, touch and release at a single location) or a swipe (for example, movement through a plurality of locations on touchscreen in a single touch input). The touchscreen interface 704 can be configured to detect and output touch input data associated with multiple touch inputs occurring simultaneously or substantially in parallel. In some cases, the simultaneous touch inputs may include instances where a user maintains a first touch on the touchscreen display 702 while subsequently performing a second touch on the touchscreen display 702. The touchscreen interface 704 can be configured to detect movement of the touch inputs. The touch input data can be transmitted to components of the user computing system 150 for processing. For example, the touch input data can be transmitted directly to the game application 710 for processing.

In some embodiments, the touch input data can undergo processing and/or filtering by the touchscreen interface 704, an operating system, or other components prior to being output to the game application 710. As one example, raw touch input data can be captured from a touch input. The raw data can be filtered to remove background noise, pressure values associated with the input can be measured, and location coordinates associated with the touch input can be calculated. The type of touch input data provided to the game application 710 can be dependent upon the specific implementation of the touchscreen interface 704 and the particular API associated with the touchscreen interface 704. In some embodiments, the touch input data can include location coordinates of the touch input. The touch signal data can be output at a defined frequency. Processing the touch inputs can be computed many times per second and the touch input data can be output to the game application for further processing.

A game application 710 can be configured to be executed on the user computing system 150. The game application 710 may also be referred to as a video game, a game, game code and/or a game program. A game application should be understood to include software code that a user computing system 150 can use to provide a game for a user to play. A game application 710 might comprise software code that informs a user computing system 150 of processor instructions to execute, but might also include data used in the playing of the game, such as data relating to constants, images and other data structures. For example, in the illustrated embodiment, the game application includes a game engine 712, game data 714, and game state information 716.

The touchscreen interface 704 or another component of the user computing system 150, such as the operating system, can provide user input, such as touch inputs, to the game application 710. In some embodiments, the user computing system 150 may include alternative or additional user input devices, such as a mouse, a keyboard, a camera, a game controller, and the like. A user can interact with the game application 710 via the touchscreen interface 704 and/or one or more of the alternative or additional user input devices. The game engine 712 can be configured to execute aspects of the operation of the game application 710 within the user computing system 150. Execution of aspects of gameplay within a game application can be based, at least in part, on the user input received, the game data 714, and game state information 716. The game data 714 can include game rules, prerecorded motion capture poses/paths, environmental settings, constraints, animation reference curves, skeleton models, and/or other game application information. Further, the game data 714 may include information that is used to set or adjust the difficulty of the game application 710.

The game engine 712 can execute gameplay within the game according to the game rules. Some examples of game rules can include rules for scoring, possible inputs, actions/events, movement in response to inputs, and the like. Other components can control what inputs are accepted and how the game progresses, and other aspects of gameplay. During execution of the game application 710, the game application 710 can store game state information 716, which can include character states, environment states, scene object storage, and/or other information associated with a state of execution of the game application 710. For example, the game state information 716 can identify the state of the game application at a specific point in time, such as a character position, character action, game level attributes, and other information contributing to a state of the game application.

The game engine 712 can receive the user inputs and determine in-game events, such as actions, collisions, runs, throws, attacks and other events appropriate for the game application 710. During operation, the game engine 712 can read in game data 714 and game state information 716 in order to determine the appropriate in-game events. In one example, after the game engine 712 determines the character events, the character events can be conveyed to a movement engine that can determine the appropriate motions the characters should make in response to the events and passes those motions on to an animation engine. The animation engine can determine new poses for the characters and provide the new poses to a skinning and rendering engine. The skinning and rendering engine, in turn, can provide character images to an object combiner in order to combine animate, inanimate, and background objects into a full scene. The full scene can be conveyed to a renderer, which can generate a new frame for display to the user. The process can be repeated for rendering each frame during execution of the game application. Though the process has been described in the context of a character, the process can be applied to any process for processing events and rendering the output for display to a user.

Example Hardware Configuration of Computing System

Figure 8:
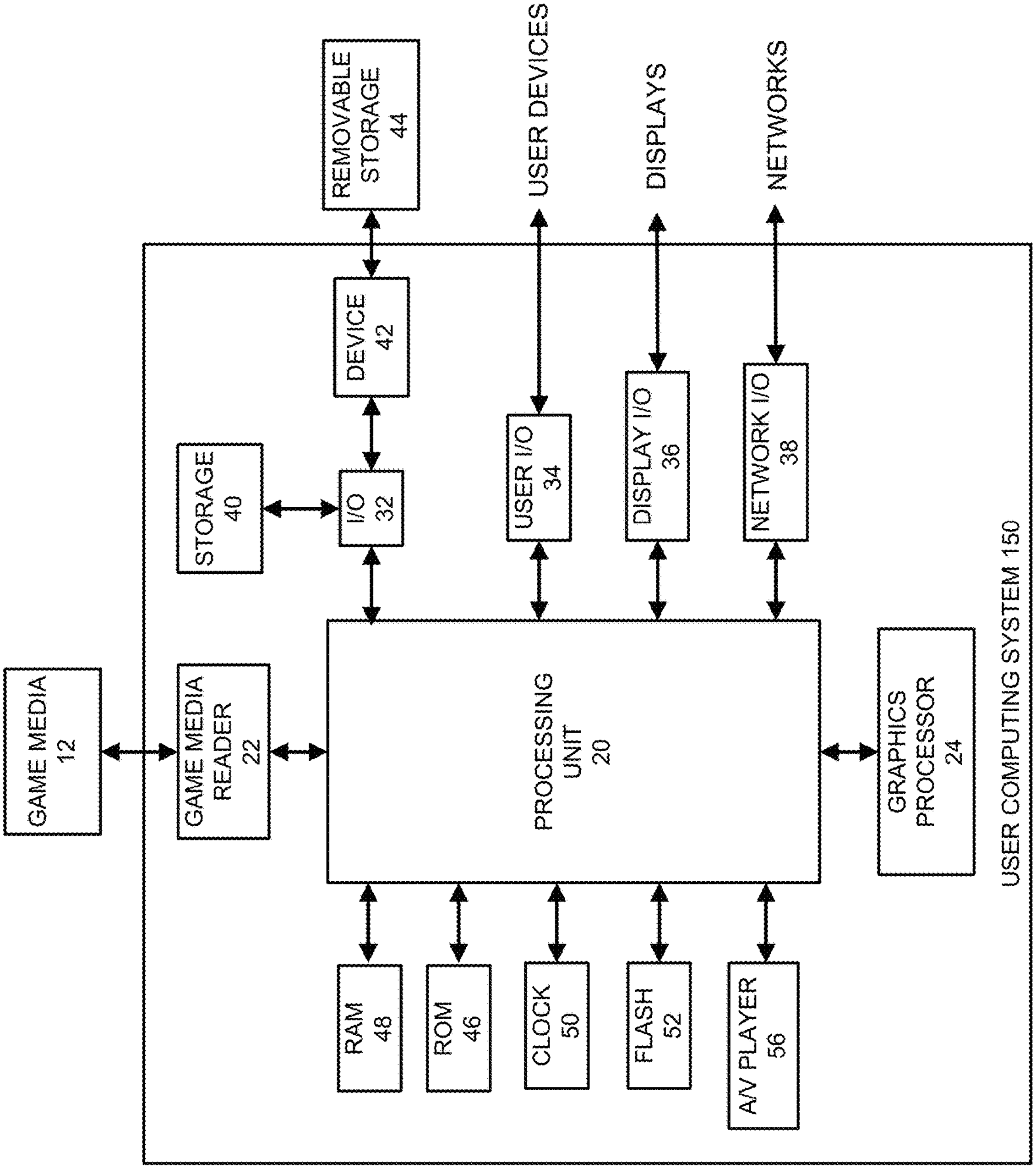
FIG. 8 illustrates an embodiment of a hardware configuration for the user computing system of FIG. 7 in accordance with certain aspects of the present disclosure.

FIG. 8 illustrates an embodiment of a hardware configuration for the user computing system 150 of FIG. 7. Other variations of the user computing system 150 may be substituted for the examples explicitly presented herein, such as removing or adding components to the user computing system 150. The user computing system 150 may include a dedicated game device, a smart phone, a tablet, a personal computer, a desktop, a laptop, a smart television, a car console display, and the like. Further, (although not explicitly illustrated in FIG. 8) as described with respect to FIG. 7, the user computing system 150 may optionally include a touchscreen display 702 and a touchscreen interface 704.

As shown, the user computing system 150 includes a processing unit 20 that interacts with other components of the user computing system 150 and also components external to the user computing system 150. A game media reader 22 may be included that can communicate with game media 12. Game media reader 22 may be an optical disc reader capable of reading optical discs, such as CD-ROM or DVDs, or any other type of reader that can receive and read data from game media 12. In some embodiments, the game media reader 22 may be optional or omitted. For example, game content or applications may be accessed over a network via the network I/O 38 rendering the game media reader 22 and/or the game media 12 optional.

The user computing system 150 may include a separate graphics processor 24. In some cases, the graphics processor 24 may be built into the processing unit 20, such as with an APU. In some such cases, the graphics processor 24 may share Random Access Memory (RAM) with the processing unit 20. Alternatively, or in addition, the user computing system 150 may include a discrete graphics processor 24 that is separate from the processing unit 20. In some such cases, the graphics processor 24 may have separate RAM from the processing unit 20. Further, in some cases, the graphics processor 24 may work in conjunction with one or more additional graphics processors and/or with an embedded or non-discrete graphics processing unit, which may be embedded into a motherboard and which is sometimes referred to as an on-board graphics chip or device.

The user computing system 150 also includes various components for enabling input/output, such as an I/O 32, a user I/O 34, a display I/O 36, and a network I/O 38. As previously described, the input/output components may, in some cases, including touch-enabled devices. The I/O 32 interacts with storage element 40 and, through a device 42, removable storage media 44 in order to provide storage for user computing system 150. Processing unit 20 can communicate through I/O 32 to store data, such as game state data and any shared data files. In addition to storage 40 and removable storage media 44, user computing system 150 is also shown including ROM (Read-Only Memory) 46 and RAM 48. RAM 48 may be used for data that is accessed frequently, such as when a game is being played.

User I/O 34 is used to send and receive commands between processing unit 20 and user devices, such as game controllers. In some embodiments, the user I/O 34 can include touchscreen inputs. As previously described, the touchscreen can be a capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online.

Display output signals may be produced by the display I/O 36 and can include signals for displaying visual content produced by the user computing system 150 on a display device, such as graphics, user interfaces, video, and/or other visual content. The user computing system 150 may comprise one or more integrated displays configured to receive display output signals produced by the display I/O 36, which may be output for display to a user. According to some embodiments, display output signals produced by the display I/O 36 may also be output to one or more display devices external to the user computing system 150.

The user computing system 150 can also include other features that may be used with a game, such as a clock 50, flash memory 52, and other components. An audio/video player 56 might also be used to play a video sequence, such as a movie. It should be understood that other components may be provided in the user computing system 150 and that a person skilled in the art will appreciate other variations of the user computing system 150.

Program code can be stored in ROM 46, RAM 48, or storage 40 (which might comprise hard disk, other magnetic storage, optical storage, solid state drives, and/or other non-volatile storage, or a combination or variation of these). At least part of the program code can be stored in ROM that is programmable (ROM, PROM, EPROM, EEPROM, and so forth), in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the play of the game and portions thereof might also be reserved for frame buffers, game state and/or other data needed or usable for interpreting user input and generating game displays. Generally, RAM 48 is volatile storage and data stored within RAM 48 may be lost when the user computing system 150 is turned off or loses power.

As user computing system 150 reads game media 12 and provides a game, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as game media 12 and storage 40.

Terminology

Conditional language used herein, such as, among others, "can," "could," "might," "may," "e.g.," and the like, unless specifically stated otherwise, or otherwise understood within the context as used, may be generally intended to convey that certain embodiments include, while other embodiments do not include, certain features, elements and/or states. Thus, such conditional language may be not generally intended to imply that features, elements and/or states may be in any way required for one or more embodiments or that one or more embodiments necessarily include these features, elements and/or states.

Conjunctive language such as the phrase "at least one of X, Y, and Z," unless specifically stated otherwise, may be otherwise understood with the context as used in general to convey that an item, term, etc. may be either X, Y, or Z. Thus, such conjunctive language may be not generally intended to imply that certain embodiments require the presence of at least one of X, at least one of Y, and at least one of Z.

While the above detailed description may have shown, described, and pointed out novel features as applied to various embodiments, it may be understood that various omissions, substitutions, and/or changes in the form and details of any particular embodiment may be made without departing from the spirit of the disclosure. As may be recognized, certain embodiments may be embodied within a form that does not provide all of the features and benefits set forth herein, as some features may be used or practiced separately from others.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Additionally, features described in connection with one embodiment can be incorporated into another of the disclosed embodiments, even if not expressly discussed herein, and embodiments may have the combination of features still fall within the scope of the disclosure. For example, features described above in connection with one embodiment can be used with a different embodiment described herein and the combination still fall within the scope of the disclosure.

It should be understood that various features and aspects of the disclosed embodiments can be combined with, or substituted for, one another in order to form varying modes of the embodiments of the disclosure. Thus, it may be intended that the scope of the disclosure herein should not be limited by the particular embodiments described above. Accordingly, unless otherwise stated, or unless clearly incompatible, each embodiment of this disclosure may comprise, additional to its essential features described herein, one or more features as described herein from each other embodiment disclosed herein.

Features, materials, characteristics, or groups described in conjunction with a particular aspect, embodiment, or example may be to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps may be mutually exclusive. The protection may be not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

Moreover, while operations may be depicted in the drawings or described in the specification in a particular order, such operations need not be performed in the particular order shown or in sequential order, or that all operations be performed, to achieve desirable results. Other operations that may be not depicted or described can be incorporated in the example methods and processes. For example, one or more additional operations can be performed before, after, simultaneously, or between any of the described operations. Further, the operations may be rearranged or reordered in other implementations, including being performed at least partially in parallel. Those skilled in the art will appreciate that in some embodiments, the actual steps taken in the processes illustrated and/or disclosed may differ from those shown in the figures. Depending on the embodiment, certain of the steps described above may be removed, others may be added.

For purposes of this disclosure, certain aspects, advantages, and novel features may be described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that may be within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise.

The scope of the present disclosure may be not intended to be limited by the specific disclosures of preferred embodiments in this section or elsewhere in this specification, and may be defined by claims as presented in this section or elsewhere in this specification or as presented in the future. The language of the claims may be to be interpreted broadly based on the language employed in the claims and not limited to the examples described in the present specification or during the prosecution of the application, which examples may be to be construed as non-exclusive.

Unless the context clearly may require otherwise, throughout the description and the claims, the words "comprise", "comprising", and the like, may be construed in an inclusive sense as opposed to an exclusive or exhaustive sense, that may be to say, in the sense of "including, but not limited to".

What is claimed is:

1. A computer-implemented method of generating player animation of a video game character of a video game that mimics movement of a real-world subject corresponding to the video game character, the computer-implemented method comprising:

as implemented by a computing system comprising one or more hardware processors configured to execute specific computer-executable instructions, accessing volumetric capture animation data for the real-world subject;

categorizing each volumetric frame in a plurality of volumetric frames included in the volumetric capture animation data based on an orthogonal feature matrix;

grouping the plurality of volumetric frames based on a categorization of each volumetric frame in the plurality of volumetric frames to obtain a set of volumetric frame groupings;

creating a set of aggregate volumetric frames by, at least, for each volumetric frame grouping of the set of volumetric frame groupings, creating an aggregate volumetric frame based on volumetric frames included in the volumetric frame grouping;

accessing a video game model of the video game character within the video game;

creating a set of corresponding in-game animation frames by, at least, for each aggregate volumetric frame in the set of aggregate volumetric frames, creating a corresponding in-game animation frame, wherein the corresponding in-game animation frame comprises an animation frame with orthogonal feature matrix values that match orthogonal feature matrix values of the aggregate volumetric frame; and generating a mimic model of the real-world subject by at least determining a difference between the set of aggregate volumetric frames and the set of corresponding in-game animation frames, wherein the mimic model is applied to the video game model of the video game character during execution of the video game to mimic the movement of the real-world subject.

2. The computer-implemented method of claim 1, wherein determining the difference between the set of aggregate volumetric frames and the set of corresponding in-game animation frames comprises determining, for each aggregate volumetric frame in the set of aggregate volumetric frames, a difference between joint rotations of a rig included in the aggregate volumetric frame and a rig included in a corresponding in-game animation frame of the set of corresponding in-game animation frames.

3. The computer-implemented method of claim 1, further comprising filtering the volumetric capture animation data to obtain the plurality of volumetric frames, wherein filtering the volumetric capture animation data comprises removing frames that do not satisfy a set of filtering rules.

4. The computer-implemented method of claim 1, wherein grouping the plurality of volumetric frames comprises performing a Bayesian inference process on the plurality of volumetric frames to cluster the volumetric frames based on values for the orthogonal feature matrix.

5. The computer-implemented method of claim 1, further comprising interpolating the plurality of volumetric frames to create missing volumetric frames, the missing volumetric frames corresponding to values of the orthogonal feature matrix associated with less than a threshold number of volumetric frames, wherein the missing volumetric frames are included with the set of aggregate volumetric frames.

6. The computer-implemented method of claim 1, further comprising smoothing aggregate volumetric frames corresponding to neighboring orthogonal feature matrix values.

7. The computer-implemented method of claim 1, further comprising:

determining that a volumetric frame corresponds to an idiosyncratic representation of the real-world subject; and adjusting a weighting of the volumetric frame to prioritize the volumetric frame when creating the aggregate volumetric frame for the volumetric frame grouping that includes the volumetric frame.

8. The computer-implemented method of claim 7, wherein determining that the volumetric frame corresponds to the idiosyncratic representation of the real-world subject comprises accessing a label associated with the volumetric frame.

9. The computer-implemented method of claim 1, wherein the orthogonal feature matrix comprises: movement angle, face angle, speed, acceleration, limb phase, and ticks to touch.

10. The computer-implemented method of claim 1, wherein the volumetric capture animation data is based at least in part on volumetric data obtained by a volumetric capture system, and wherein the in-game animation frames are based at least in part on motion capture data.

11. The computer-implemented method of claim 1, wherein a rig associated with a volumetric frame that is associated with the real-world subject comprises less bones than a rig associated with the video game model of the video game character.

12. The computer-implemented method of claim 1, further comprising storing the mimic model in a game data repository for the video game, wherein an amount of storage space to store the mimic model is at least a magnitude smaller than an amount of storage space to store a character model directly generated using the volumetric capture animation data.

13. The computer-implemented method of claim 1, further comprising:

aggregating a set of mimic models including the mimic model to obtain an aggregate mimic model; and associating the aggregate mimic model with a second real-world subject, wherein the computing system lacks access to volumetric capture animation data for the second real-world subject.

14. The computer-implemented method of claim 1, wherein generating the mimic model further comprises extrapolating values of the mimic model to determine a value for a boundary condition associated with the orthogonal feature matrix.

15. The computer-implemented method of claim 1, wherein the real-world subject is a human.

16. A system comprising:

an electronic data store configured to store volumetric capture animation data for a real-world subject; and a hardware processor of a computing system in communication with the electronic data store, the hardware processor configured to execute specific computer-executable instructions to at least:

access the volumetric capture animation data for the real-world subject from the electronic data store;

categorize each volumetric frame in a plurality of volumetric frames included in the volumetric capture animation data based on an orthogonal feature matrix;

group the plurality of volumetric frames based on a categorization of each volumetric frame in the plurality of volumetric frames to obtain a set of volumetric frame groupings;

create a set of aggregate volumetric frames by, at least, for each volumetric frame grouping of the set of volumetric frame groupings, creating an aggregate volumetric frame based on volumetric frames included in the volumetric frame grouping;

access a video game model of a video game character within a video game, wherein the video game model corresponds to the real-world subject;

create a set of corresponding in-game animation frames by, at least, for each aggregate volumetric frame in the set of aggregate volumetric frames, creating a corresponding in-game animation frame, wherein the corresponding in-game animation frame comprises an animation frame with orthogonal feature matrix values that match orthogonal feature matrix values of the aggregate volumetric frame; and generate a mimic model of the real-world subject by at least determining a difference between the set of aggregate volumetric frames and the set of corresponding in-game animation frames, wherein the mimic model is applied to the video game model of the video game character during execution of the video game to mimic movement of the real-world subject.

17. The system of claim 16, wherein determining the difference between the set of aggregate volumetric frames and the set of corresponding in-game animation frames comprises determining, for each aggregate volumetric frame in the set of aggregate volumetric frames, a difference between joint rotations of a rig included in the aggregate volumetric frame and a rig included in a corresponding in-game animation frame of the set of corresponding in-game animation frames.

18. The system of claim 16, wherein the hardware processor is further configured to execute the specific computer-executable instructions to at least filter the volumetric capture animation data to obtain the plurality of volumetric frames, wherein filtering the volumetric capture animation data comprises removing frames that do not satisfy a set of filtering rules.

19. The system of claim 16, wherein the hardware processor is further configured to execute the specific computer-executable instructions to at least:

determine that a volumetric frame corresponds to an idiosyncratic representation of the real-world subject; and adjust a weighting of the volumetric frame to prioritize the volumetric frame when creating the aggregate volumetric frame for the volumetric frame grouping that includes the volumetric frame.

20. The system of claim 19, wherein adjusting the weighting of the volumetric frame increases a probability that the video game displays an animation depicting the video game character performing an idiosyncratic action associated with the real-world subject.

* * * * *